United States Patent Office 3,423,662
Patented Jan. 21, 1969

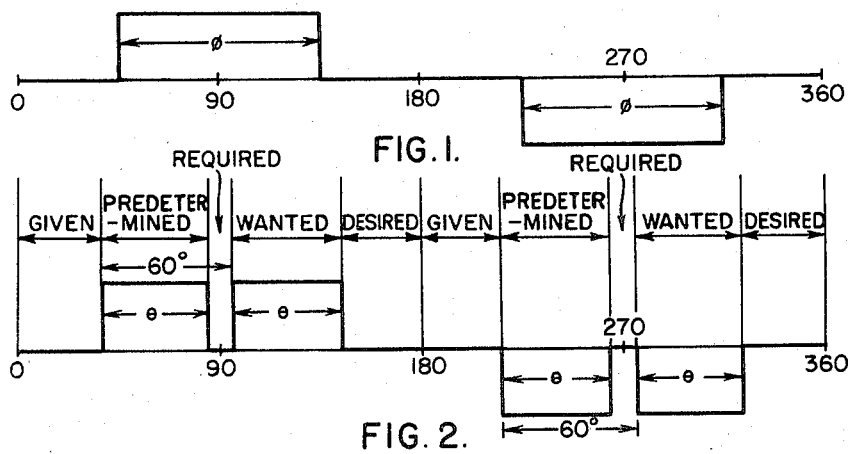
FIG. 1.
FIG. 2.
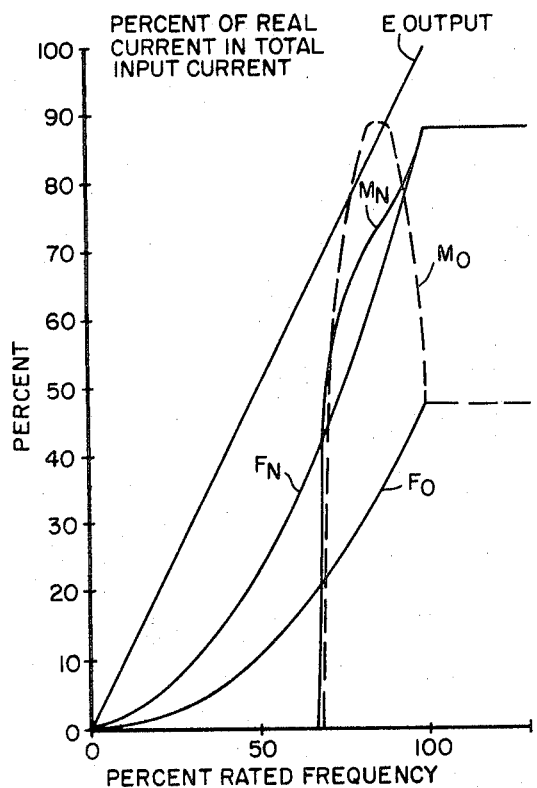
FIG. 3.
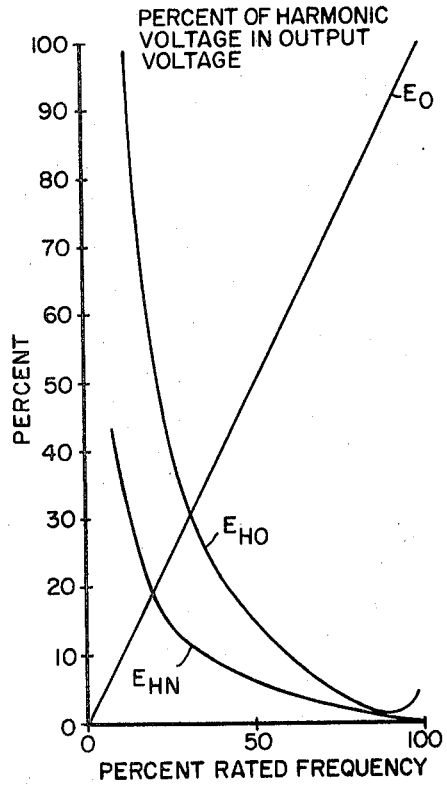
FIG. 4.

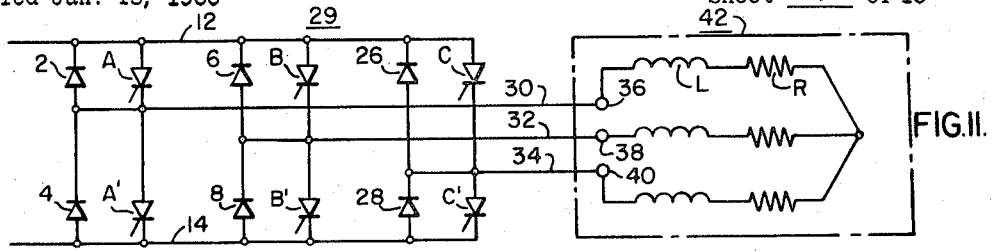
FIG.II.
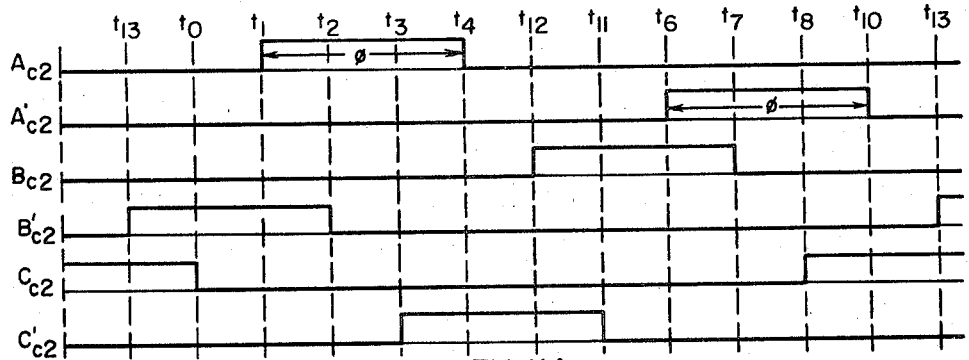
FIG.IIA.
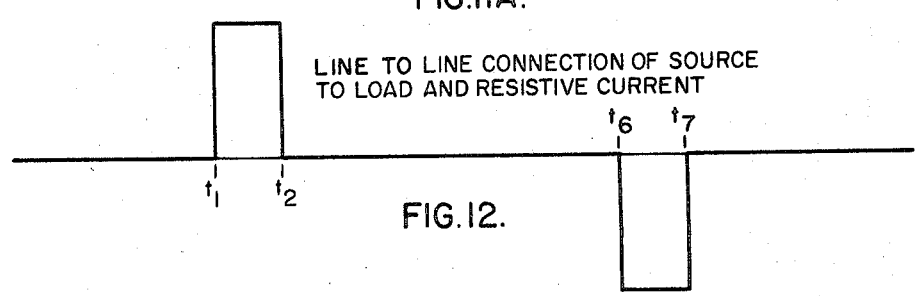
LINE TO LINE CONNECTION OF SOURCE TO LOAD AND RESISTIVE CURRENT
FIG.12.
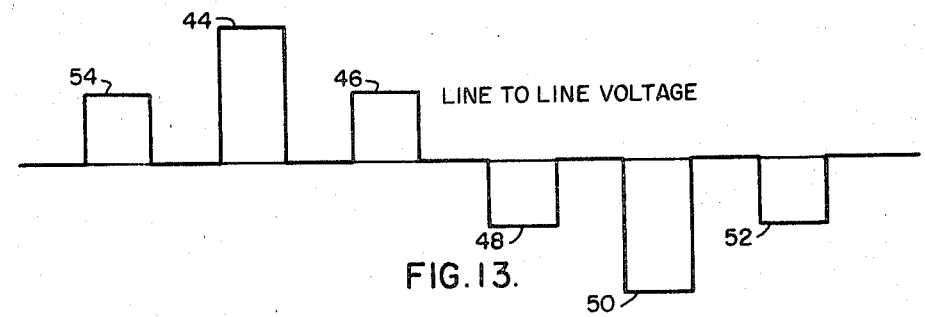
LINE TO LINE VOLTAGE
FIG.13.
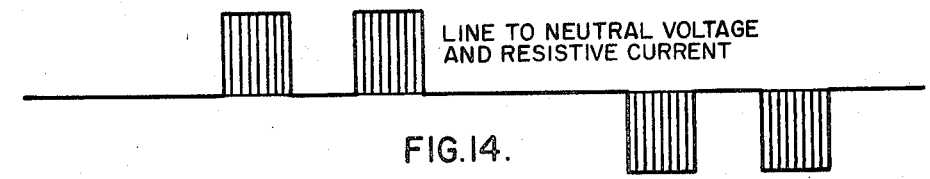
LINE TO NEUTRAL VOLTAGE AND RESISTIVE CURRENT
FIG.14.

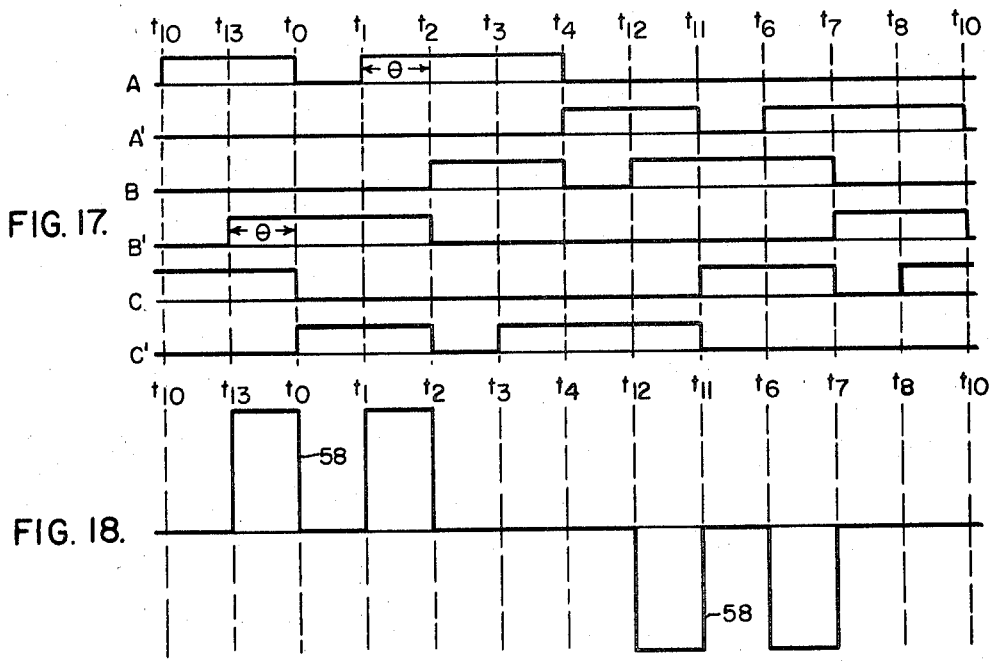
FIG. 17.
FIG. 18.
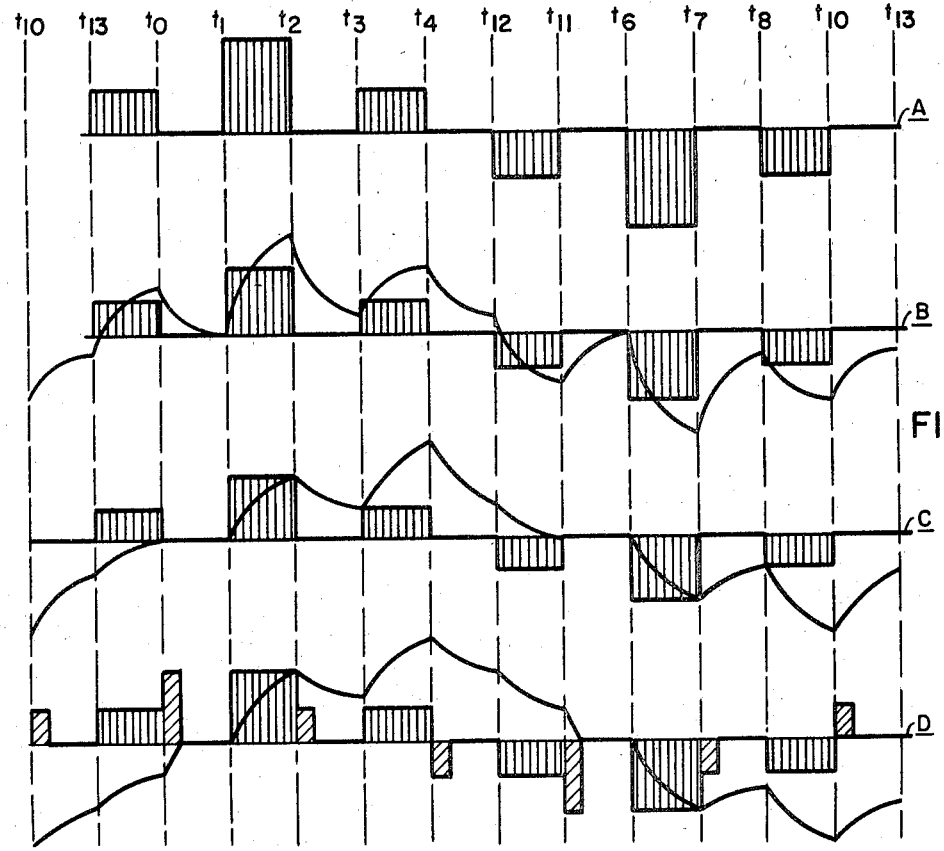
FIG. 19.

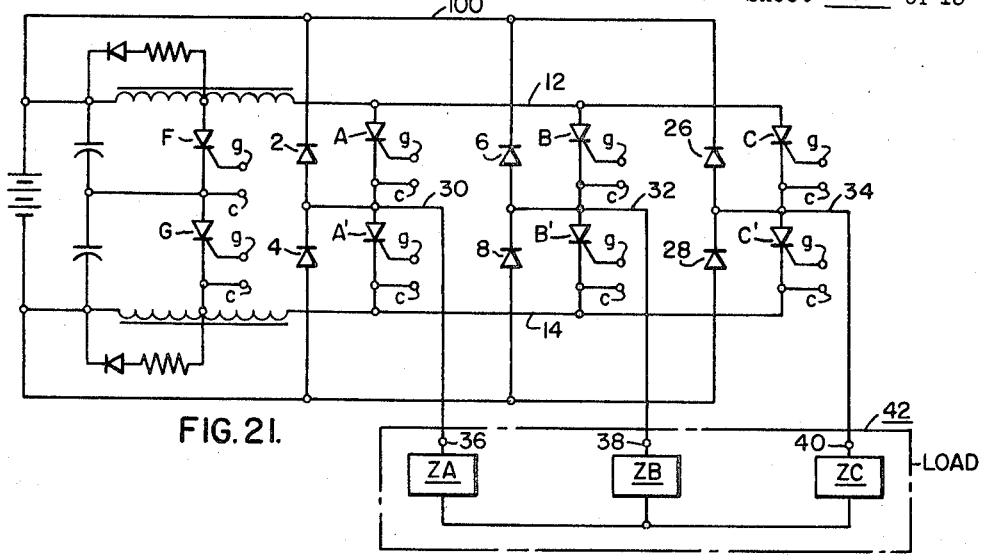
FIG.21.
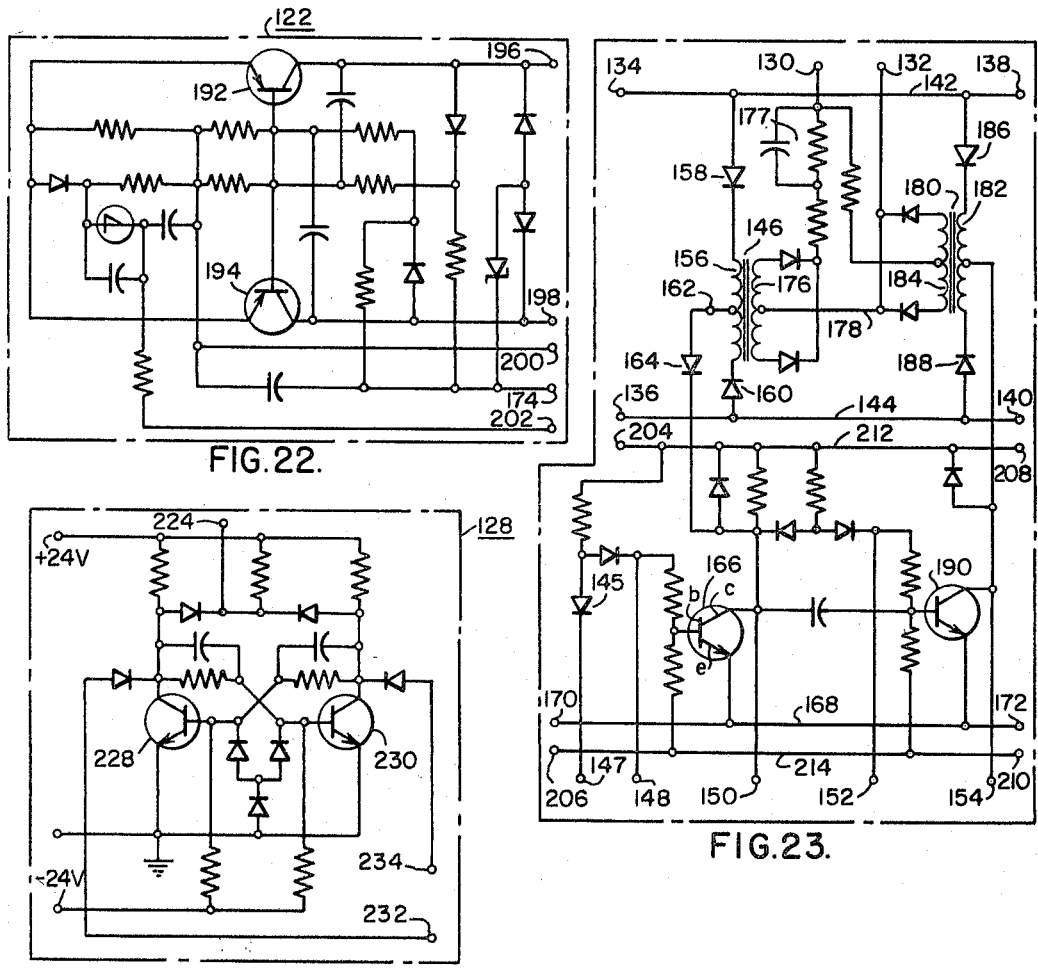
FIG.22.
FIG.23.
FIG.26.

3,423,662
METHOD FOR OPERATING INVERTERS
Leland A. Schlabach, Wilkins Township, Pittsburgh, and Laszlo Gyugyi, Penn Hills, Pittsburgh, Pa., assignors to Westinghouse Electric Corporation, Pittsburgh, Pa., a corporation of Pennsylvania
Filed Jan. 13, 1966, Ser. No. 520,498
U.S. Cl. 321—5    12 Claims
Int. Cl. H02m 7/52

ABSTRACT OF THE DISCLOSURE

A method for operating an inverter to provide an output which eliminates or attenuates at least the lower harmonics and which will reduce the normal variation in the output voltage caused by changes in the power factor of the load supplied thereby. The results are obtained by connecting the voltage supply terminals twice each 180° of the output voltage with the initiation of the second connection following the initiating of the first connection by 60 degrees. The method also provides for concurrently connecting the output terminals together in two current conducting paths arranged to conduct current in opposite directions. One of these paths conducts reactive energy to the source when the reactive current flows in a direction to oppose the voltage next to be applied to thereby maintain the voltage at the output terminal and rapidly reduce the reactive energy. The other concurrently connected path is effectively a short circuit to any reactive current flowing in the same direction as the current caused by the next to be applied voltage to maintain reactive energy in the load during the period when the source terminals are not connected to supply voltage to the load or output terminals.

---

This invention provides a new method for firing inverters for improving their performance and is especially useful when the inverter is used to drive an electric motor.

An object of this invention is to provide a new method for firing inverters which will provide an output which may be voltage controlled and which will be usable without filters.

A further object of this invention is to provide an apparatus for providing a single phase inverter output which is free of the third harmonic without the necessity of complicated networks.

A still further object of this invention is to provide a method and apparatus for providing a three phase inverter output voltage which is controllable in magnitude and which voltage is independent of the load magnitude over a substantial range of operation of the inverter.

Another object of this invention is to provide improved apparatus for use in performing the method of the invention.

Other objects will be apparent from the specification, the hereinafter appended claims and the drawings in which:

FIG. 1 is a diagrammatic representation of the prior art method of firing an inverter;

FIG. 2 is a similar view showing the method of firing the inverter in accordance with the invention;

FIG. 3 is the chart comparing various operating characteristics of an inverter operated in accordance with this invention with an inverter operated in accordance with the prior art;

FIG. 4 is a further chart comparing other operating characteristics of an inverter operating in accordance with this invention with an inverter operated in accordance with the prior art;

FIG. 11 illustrates a portion of a three phase bridge inverter which may be operated in accordance with the method of this invention;

FIG. 11A is a diagrammatic view illustrating the prior art method of operating the inverter illustrated in FIG. 11;

FIGS. 12, 13 and 14 illustrate the various output operating characteristics quantities obtained when the inverter of FIG. 11 is operated in accordance with the prior art method illustrated in FIG. 11A;

FIGS. 15A–15D show the relationships when the inverter is connected to a static load operating at various power factors;

FIGS. 15E and 15F show the relationships when the inverter is connected to a motor operating at various power factors;

FIG. 17 is a diagrammatic view illustrating the new method of operating the inverter illustrated in FIG. 11;

FIG. 18 illustrates the method of connecting one of the pairs of output conductors to the source terminals;

FIG. 19 illustrates phase voltages and currents obtained when operating the inverter of FIG. 11 in accordance with the method of the invention as illustrated in FIG. 17;

FIGS. 21, 22, 23, 24, 25 and 26 illustrate schematic circuits which may be embodied in certain of the blocks shown in Fig. 20;

Figure 5:
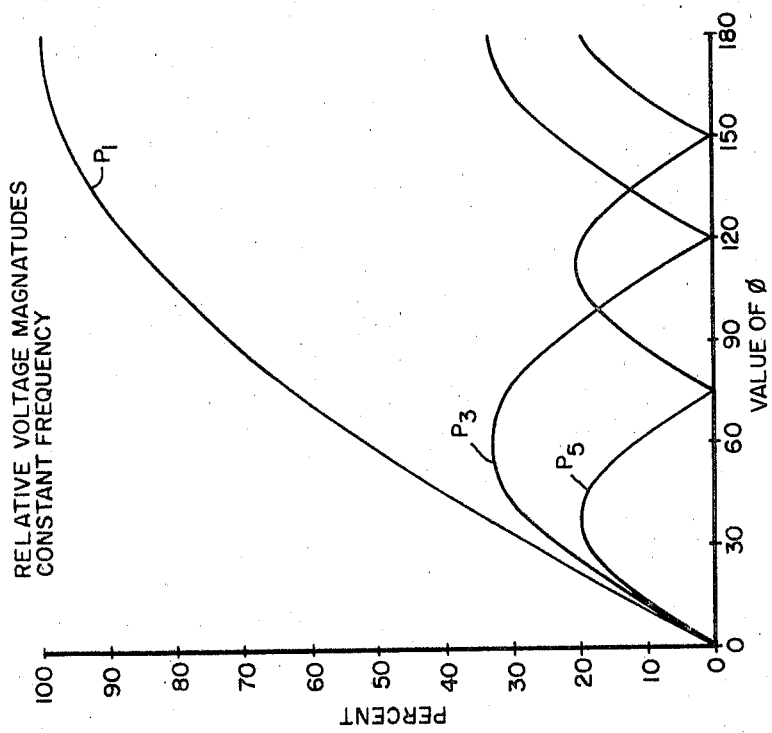
FIG. 5 is a chart showing the relative magnitude of the fundamental and the next two harmonic voltages which appear in the output of an inverter operated in accordance with the method of the prior art.

Prior art inverters have been voltage controlled by varying the duration of the time that the output terminals have been connected to the voltage supplying terminals resulting in the so-called pulse width control. As illustrated in FIG. 1, the output voltage would be controlled by varying the magnitude of the angle $\phi$. When so operated, the relative magnitudes of the voltages at the output terminals thereof would be as illustrated in FIG. 5 wherein the voltage magnitudes are plotted as a function of the angle $\phi$ between the maximum range of 0 to 180°. In FIG. 5 the curve $P_1$ illustrates the voltage magnitude at the fundamental frequency, $P_3$ the voltage magnitude at the third harmonic frequency and $P_5$ the voltage magnitude at the fifth harmonic frequency.

As illustrated in FIG. 2, the inverter when operated in accordance with the method of this invention connects each pair of output terminals to the direct current supply terminals for two periods of identical duration, as indicated by angle $\theta$, and at periods which are spaced apart exactly 60° based upon the output frequency at the output terminals. These two connections occur in each output half cycle. When the inverter is so controlled, the third harmonic and all multiples thereof completely disappear leaving the fifth harmonic the lowest appearing harmonic.

Figure 6:
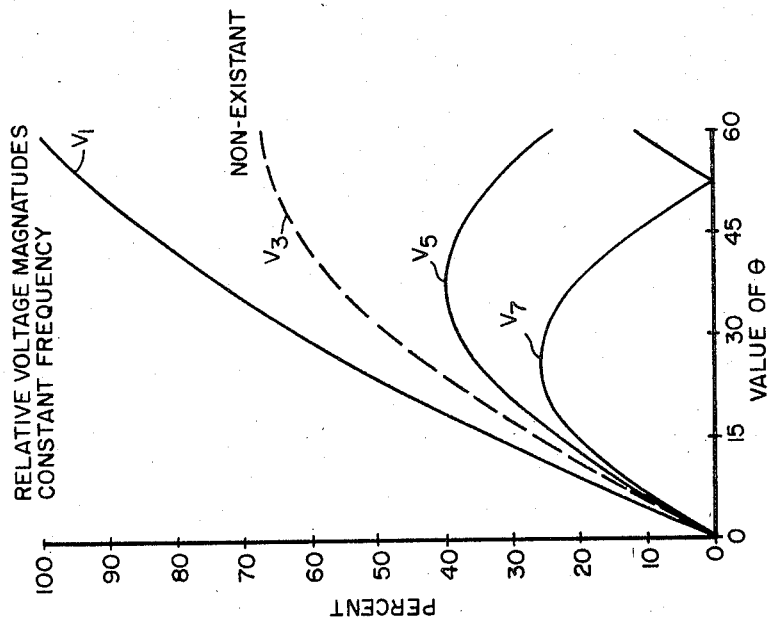
FIG. 6 is a similar chart showing the relative voltage magnitudes of the fundamental and the first two existing harmonics in the output voltage of an inverter operated in accordance with the method of this invention.

The dotted curve $V_3$ has been added to FIG. 6 even though it is nonexistent to illustrate the relative magnitudes of the third and fifth harmonic voltages in the same proportionality as they are illustrated in FIG. 5 wherein curves $P_1$, $P_3$ and $P_5$ illustrate the proportionality of the existence of the fundamental, the third and the fifth harmonic voltages occurring in the prior art method. The addition of the dotted curve $V_3$ eliminates the misconception which might be present in FIG. 6 because the curve $V_1$ is drawn to provide full 100 percent magnitude at 60 degrees wherein the valve of $P_1$ is only 50 percent at 60 degrees in FIG. 5.

FIG. 6 shows the relative voltage magnitudes of the inverter when operated in accordance with the sequence of FIG. 2 and in which $V_1$ indicates the relative voltage magnitude of the fundamental frequency, $V_5$ that of the fifth harmonic and $V_7$ that of the seventh harmonic. With the method of FIG. 2, the maximum connecting or firing interval $\theta$ of the inverter is 60 degrees. Since two such intervals occur each half cycle, the maximum total connected interval is 120 degrees.

FIG. 4 compares the operation of an inverter under the old and new methods at a varying frequency and at varying output voltage as indicated by the straight line $E_o$. The curve $E_{HO}$ indicates the harmonic content of the output voltage of the inverter in percent which should be filtered out when the inverter is operated with the prior art method while the curve $E_{HN}$ indicates the same quantity when the inverter is operated in accordance with the method of this invention. These curves $E_{HO}$ and $E_{HN}$ illustrate that the total harmonic content of the inverter when operated by the method of the invention at no time exceeds that of the content when the inverter is operated by the prior art method and for substantially all frequency output is markedly reduced. This total means that a smaller filter would remove the harmonics of $E_{HN}$ than would be required to remove the harmonics $E_{HO}$.

The capabilities of the inverter to energize an induction motor with no filtering when the inverter is driven by the new art and the prior art methods is shown in FIGS. 3 and 4. The dash-dash curve $M_O$ indicates the percent of real or load driving current available when the total input current to the motor is held at the maximum rotor design input R.M.S. current when the inverter is operated by the prior art method. The solid line $M_N$ indicates in like manner the percent of real or load driving current of the total input current to the motor when the inverter is operated in accordance with the method of this invention. At 100 percent rated frequency and with the inverter driven by the method of this invention, the magnitude of the useful or real current to the motor is nearly twice that available when the inverter is operated in accordance with the prior art method.

If for example, the motor were operating a fan load and the inverter were controlled by the method of the invention, the motor would be able to drive a load having a load-current characteristic curve illustrated by the line $F_N$ rather than a load having a substantially lesser load-current characteristic curve illustrated by the line $F_O$.

In the event it is desired to operate the motor at a frequency less than the percent frequency as illustrated by the intersections of the curves $M_N$ and $M_O$ with the zero base line, a filter is necessary to filter out the harmonic currents. In the event no filter is provided the harmonic currents at no load would cause failure of the motor. FIG. 4 indicates that the filter network required for this purpose when the inverter is operated in accordance with the method of this invention will be substantially less than that which would be required were the inverter operated by the prior art system. The magnitude of their reduction is indicated by the vertical distance between the curves $E_{HO}$ and $E_{HN}$.

Figure 7:
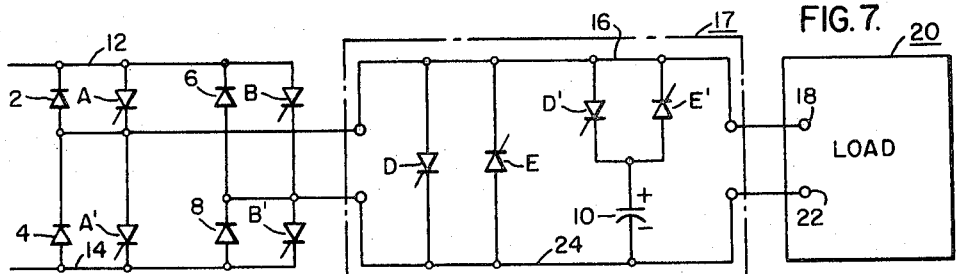
FIG. 7 is a partial schematic diagram illustrating elements of a bridge-type inverter which may be operated in accordance with the method of this invention.

FIG. 7 illustrates an inverter which may be operated in accordance with the method of this invention and comprises suitable switching devices such as thyristors A, A', B and B' shunted respectively by diodes 2, 4, 6 and 8 connected between the unidirectional potential input busses 12 and 14 in the usual manner. The inverter is further provided with alternating energized output busses 16 and 24 which connect the inverter to terminals 18 and 22 of a load 20. Preferably the busses 16 and 24 are interconnected with a network 17 embodying the thyristors D, D', E and E' and the capacitor 10. Within the generic concept of this invention the network 17 is not required, but the inclusion thereof will eliminate the last vestige of the third harmonic which might otherwise appear at the load during the intervals that the thyristors D and E are shown as being conducting in FIG. 8.

At a time $t_{1a}$ and referring to the curve $A_c$, the thyristors A and B' are rendered conducting to connect the output busses 16 and 24 to the input busses 12 and 14 respectively. This provides a current path from the positive bus 12 through the thyristor A, and bus 16 to the terminal 18 of the load 20 and from the load terminal 22 through the bus 24 and the thyristor B' to the negative bus 14. This connection is maintained until the time $t_{2a}$, as indicated by the raised portions of the curves $A_c$ and $B'_c$ at which time the thyristors A and B' are rendered nonconducting by suitable means (not shown in FIG. 7). At the time $t_{2a}$ the thyristor E is rendered conducting as indicated by the raised portion of the curve $E_c$ to establish a path for the reactive current between the busses 24 and 16. At the time $t_{4a}$ the thyristors A and B' are rendered conducting for the second interval as indicated by the curves $A_c$ and $B'_c$ and the thyristor E' is rendered conducting to extinguish the thyristor E by the discharge effect of the capacitor 10. This is illustrated by the curves $E_c$ and $E'_c$.

The thyristors A and B' are maintained conducting, to determine the interval of the second connection, until the time $t_{5a}$ when they are extinguished. At the time $t_{5a}$ the thyristor E is again rendered conducting to provide a path for the flow of reactive current between the busses 24 and 16. This path is maintained until the time $t_{6a}$ at which time the thyristors B, A' and E' are rendered conducting as indicated by the curves $B_c$, $A'_c$ and $E'_c$. The rendering of thyristors B and A' conductive connects the output busses 16 and 24 to the input busses 14 and 12 respectively to provide a path for the flow of current from the bus 12 through the thyristor B and bus 24 to the load terminal 22 and from the load terminal 18 through bus 16 and thysitor A' to the negative bus 14. The rendering of the thyristor E' conducting renders the thyristor E nonconducting.

The thyristors B and A' continued to remain conductive and maintain the path until the time $t_{7a}$. At this time the thyristors B and A' are rendered nonconducting and the thyristor D is rendered conducting to interrupt the connection of the busses 16 and 24 to the busses 14 and 12 and to establish a path for the flow of the reactive current between the bus 16 to the bus 24. The thyristor D continues to maintain the reactive current path until the time $t_{9a}$ at which time the thyristor D' is rendered conducting to render the thyristor D nonconducting. At the time $t_{9a}$ the thyristors B and A' are again rendered conducting to connect the busses 16 and 24 to the busses 14 and 12. This connection continues until the time $t_{10a}$ when the thyristors B and A' are rendered nonconducting to disconnect the busses 16 and 24 from the busses 14 and 12. The thyristor D is rendered conducting at time $t_{10a}$ to establish a path for the flow of reactive current between the busses 16 and 24. Thyristor D remains conducting until the time $t_{1a}$ at which time the apparatus goes into another cycle as above described.

Figure 8:
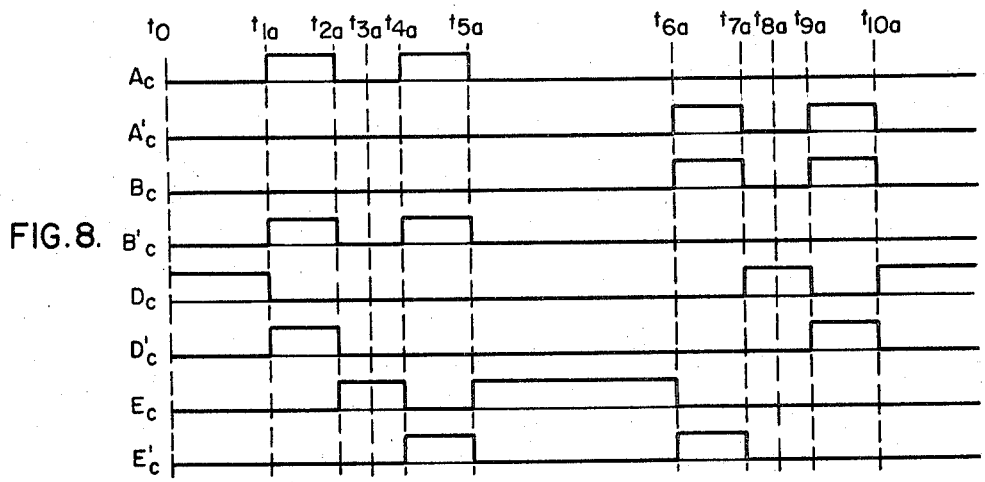
FIG. 8 is a diagrammatic view of one method of operating the inverter of FIG. 7 in accordance with this invention.
Figure 10:
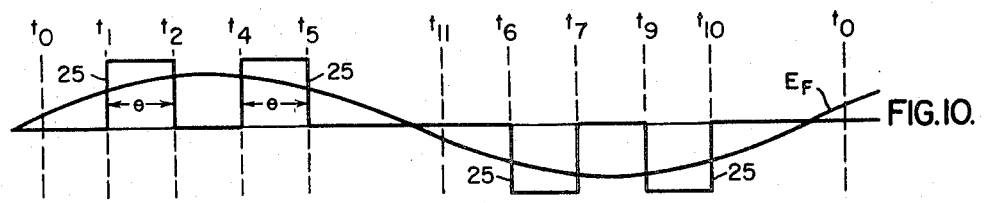
FIG. 10 shows in diagrammatic form certain of the operating characteristics of the inverter of FIG. 7 when operated by the method shown in FIGS. 8 and 9.

It will now be understood that the load 20 is connected to the source busses 12 and 14 for the two intervals $t_{1a}-t_{2a}$ and $t_{4a}-t_{5a}$ in one polarity and for the two intervals $t_{6a}-t_{7a}$, and $t_{9a}-t_{10a}$ in the reverse polarity as illustrated in FIG. 8. With the inverter controlled in the manner, the fundamental frequency of the output frequency will be as shown by the curve $E_F$ shown in FIG. 10. The magnitude of the output voltage may be regulated by suitable means to vary the angle $\theta$. The interval between the times $t_{1a}$ and $t_{4a}$ and the interval between the times $t_{6a}$ and $t_{9a}$ should be maintained as nearly 60 electrical degrees as possible; the degrees being based on the time period of the fundamental output voltage $E_F$. When the apparatus is so operated, no third harmonic will be present in the output of the inverter at the load terminals 18 and 22.

Figure 9:
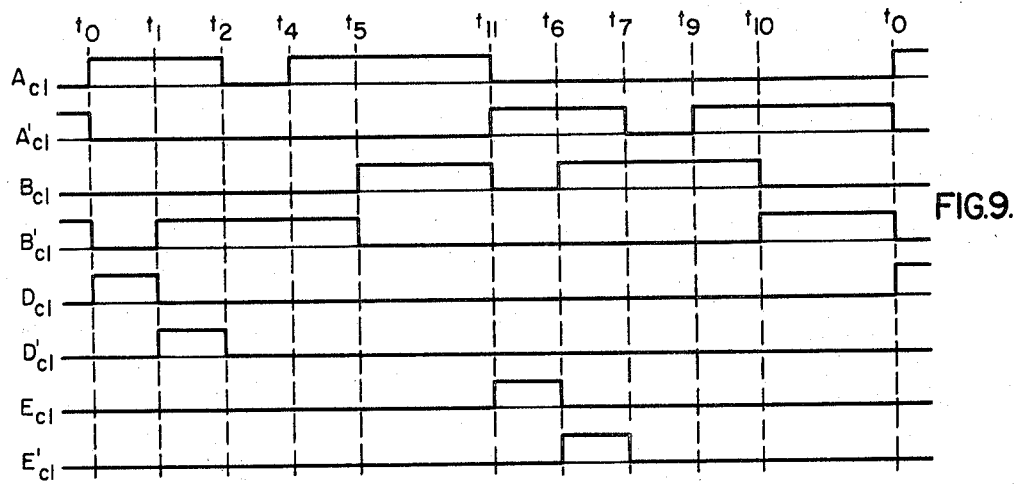
FIG. 9 is a view similar to FIG. 8 showing a modified method of operating the single phase inverter of FIG. 7 in accordance with the invention.

FIG. 9 shows schematically another method of operating the inverter of FIG. 7 in which the curves $A_{c1}$, $A'_{c1}$, $B_{c1}$, $B'_{c1}$, $D_{c1}$, $D'_{c1}$, $E_{c1}$ and $E'_{c1}$ illustrate the time intervals at which the corresponding thyristors A, A', B, B', D, D', E and E' are rendered conducting. More specifically, in the sequence of FIG. 9, the thyristor A is maintained conducting during the intervals $t_0-t_2$ and $t_5-t_{11}$. Each of these intervals are shown as being 60 electrical degrees. The thryistor A also conducts during the time interval $t_4-t_5$ is adjustable and controls the angle $\theta$ of FIG. 2. There is no interruption of conduction of thyristor A at the time $t_5$. The thyristor A' is maintained conducting during the intervals $t_{11}-t_7$ and $t_{10}-t_0$, each of which is shown as being 60 degrees. The interval $t_9-t_{10}$ is adjustable and controls the angle $\theta$ of FIG. 2. The thyristor A' conducts without interruption between the intervals $t_9-t_{10}$ and $t_{10}-t_0$. The thyristors B and B' rendered conductive during corresponding intervals is illustrated by curves $B_{c1}$ and $B'_{c1}$ which are displaced 120 degrees from the curve $A_{c1}$ and $A'_{c1}$.

During the time interval $t_0-t_1$ the thyristor D is maintained conducting as indicated by the curves $D_{c1}$. At the end of the time interval $t_0-t_1$, the thyristor D' is rendered conducting (see curve $D'_{c1}$) to extinguish the thyristor D and the thyristor B' (see curve $B'_{c1}$) is rendered conducting. The rendering conducting of the thyristor B' completes a connection (see curve 25, FIG. 10) which connects the busses 16 and 24 to the busses 12 and 14 through a circuit which includes the thyristor A. This connection continues for the time interval $t_1$ to $t_2$ at which time the thyristor A is rendered nonconducting as indicated by curve $A_{c1}$. When this occurs, reactive current can flow from the bus 24 through the thyristor B' which is still in a conducting condition through the diode 4 and bus 16 back to the load terminal 18. This path is available for the time period $t_2-t_4$. At the time $t_4$, the thyristor A is again rendered conducting to reconnect the busses 16 and 24 to the busses 12 and 14 to provide the second connection (see curve 25 in FIG. 10).

At the time $t_5$ the thyristor B' is rendered nonconducting to end the period of the second connection of the output busses 16 and 24 to the input busses 12 and 14. When thyristor B' becomes nonconducting the reactive current can flow through a path which extends from the terminal 22 through bus 24, the diode 6, thyristor A and bus 16 to the load terminal 18. This path is effective during the interval $t_5-t_{11}$. At the time $t_{11}$, the thyristor E is rendered conducting and completes an obvious path for reactive current flow between the busses 24 and 16 which is maintained for the interval $t_{11}-t_6$. At the time $t_6$, the thyristors A' and E' are rendered conducting. Conduction of the thyristor E' renders the thyristor E nonconducting. Conduction of the thyristor A' conducting connects the output busses 16 and 24 to the potential supply busses 12 and 14 in the opposite polarity to that discussed above in connection with the intervals $t_1-t_2$ and $t_4-t_5$. A path is thus established from the bus 12 through thyristor B, bus 24 to the load terminal 22 and from the load terminal 18 through bus 16 and thyristor A' to the negative bus 14.

This path continues for the interval $t_6-t_7$. At the time $t_7$, the thyristor A' is rendered nonconducting and the connection is interrupted. At the time the thyristor A' is rendered nonconducting, reactive current can flow through a path which extends from the terminal 18 through bus 16, diode 2, thyristor B and bus 24 to the terminal 22. This path is effective for the time period $t_7-t_9$. At the time $t_9$, thyristor A' is rendered conductive to connect the output busses 24 and 16 to the supply busses 12 and 14 respectively for the time period $t_9-t_{10}$, see curve 25 of FIG. 10. At the time $t_{10}$, the thyristor B is rendered nonconducting and the thyristor B' conducting. The rendering of the thyristor B nonconducting disconnects the load 20 from the input busses 12 and 14. Reactive current can flow from the terminal 18 through bus 16, thyristor A', diode 8 and bus 24 to the load terminal 22. This path for the reactive current flow is effective for the time period $t_{10}-t_0$. At the time $t_0$, the thyristor A' is rendered nonconducting. However, at this time $t_0$, the thyristor D is rendered conducting and an obvious reactive current path is established between the busses 16 and 24 for the time period $t_0-t_1$. At the time, the cycle again repeats. The connection intervals $t_{1a}-t_{2a}$; $t_{4a}-t_{5a}$; $t_{6a}-t_{7a}$; and $t_{9a}-t_{10a}$ and somewhat displaced in time from the intervals $t_1-t_2$; $t_4-t_5$; $t_6-t_7$; and $t_9-t_{10}$ so that the fundamental voltage $E_F$ is somewhat displaced in phase so that its 0 and 180 degree points do not agree but are intermediate the times $t_{10}-t_0$ and $t_5-t_{11}$.

FIG. 11 fragmentarily illustrates an inverter 29 of the type shown in FIG. 7 and embodying the same thyristors A, A', B, B' and diodes 2, 4, 6 and 8. The inverter 29 additionally includes thyristors C and C' and diodes 26 and 28 whereby it takes the form of the usual three-phase inverter bridge. Inverter 29 is provided with output busses 30, 32 and 34 connected to the input terminals 36, 38 and 40 of a three-phase Y connected load 42 having inductance L and resistance R. The curves $A_{c2}$, $A'_{c2}$, $B_{c2}$, $B'_{c2}$, $C_{c2}$ and $C'_{c2}$ indicate diagrammatically the prior art system of firing the thyristors A, A', B, B', C and C' to supply the load in accordance with the prior art at pulse intervals equal to the angle $\phi$. As shown in FIG. 12 the busses 30 and 32 are connected to the source busses 12 and 14 only once each half cycle of the voltage at the busses 30 and 32. In FIG. 13 the voltage between the busses 30 and 32 comprise three discrete pulses each half cycle. Two of these pulses are ½ the amplitude of the main pulses 44 and 50 which occurs when the busses 30 and 32 are connected to the input busses 12 and 14.

FIG. 14 illustrates the current flow in the load 42 when the load is purely resistive.

The firing angles illustrated in FIG. 11A have been selected with respect to the firing angles illustrated in FIG. 9 so that the periods during which the busses 30, 32 and 34 are connected to the load 42 are the same durations. For that reason, the same time curves $t_0-t_{11}$ may be used. It is believed that a detailed description of the operation of the inverter 29 by the prior art method is not necessary and that it is sufficient to say that it provides a single connection of the pairs of output busses 30–32, 32–34, and 34–30 each half cycle of the output cycle supplied to the load 42. It can be shown that the current and voltage relationships which exist will take the form shown in FIGS. 14 and 15A through E when the load is static.

Figure 15:
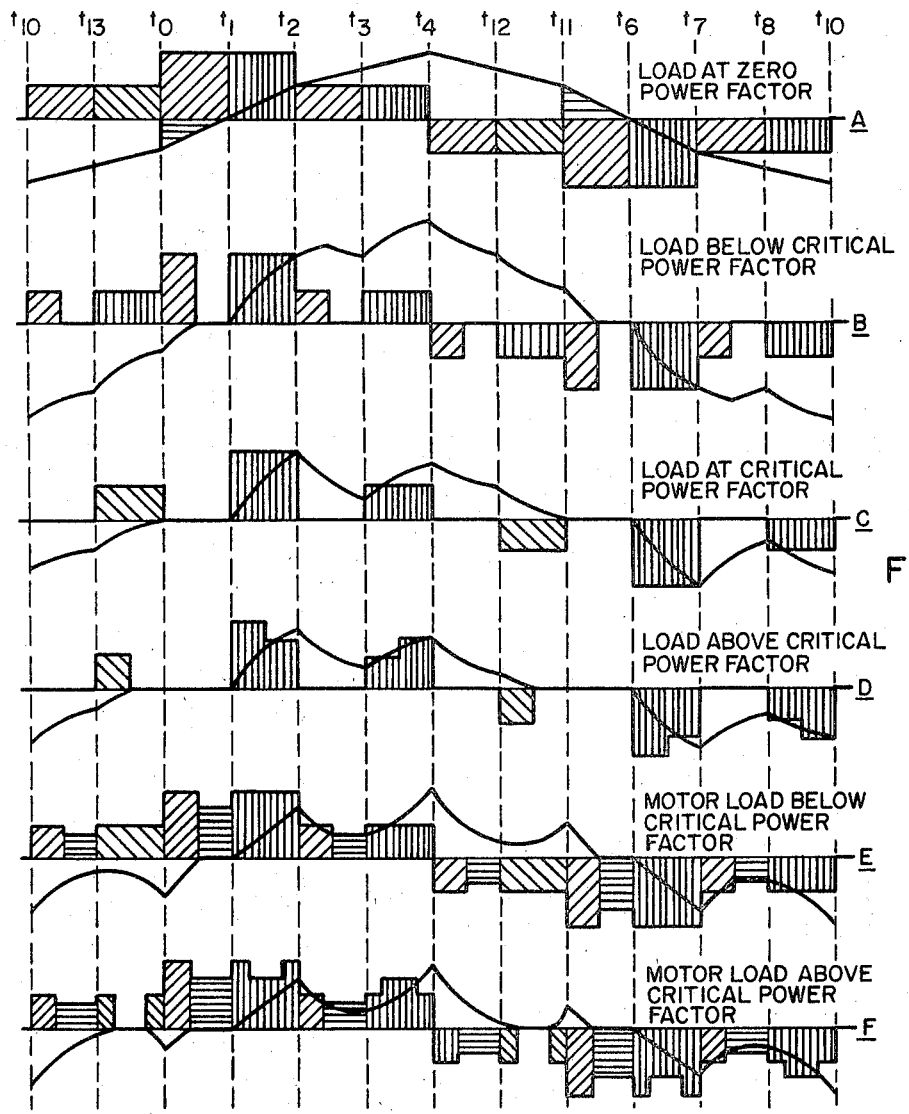
FIG. 15 illustrates the phase voltages and currents obtained in a Y-connected load.

FIG. 15A illustrates the voltage (hatched areas) and current (pseudo sine wave) when the load is pure inductance (zero power factor). FIG. 15B shows the effect of adding some resistance but maintaining the load highly inductive (very low power factor). FIG. 15C shows the effect of a high ratio of resistance to inductance; the ratio being at a critical relationship (critical power factor). FIG. 15D shows the operation when the ratio of resistance to inductance is greater than the critical value; but still has some inductance (high power factor which is less than 1). FIG. 14 shows the operation at pure resistance (unity power factor).

FIGS. 15E and 15F illustrate similarly the operation of the prior art system when connected to energize an inductive motor. FIG. 15E illustrates the operation with the motor load below a critical power factor while FIG. 15F illustrates the operation with a motor load above the critical power factor.

Referring more specifically to FIG. 15A, the curve 56 represents the current flowing in the phase which exists between input terminal 36 and neutral. The output voltages of this phase are indicated by the hatched rectangles; the rectangles of lesser amplitude being of a magnitude equal to ⅓ of the voltage appearing between the busses 12 and 14 and those of the higher amplitude being equal to ⅔ of the voltage between the busses 12 and 14. The areas having the hatching which extends at an angle upwardly toward the right indicate the voltages regenerated by the inductance in the load and for which forward current paths therefor are provided in the inverter. Those areas having the hatching which extends upwardly toward the left indicate the voltages also regenerated by the inductance but for which no forward current paths are directly provided therefor.

Under some power condition indirect paths for current caused by this voltage are provided through a diode which is held conducting by forward current flow in another of the phases of the three-phase load. The rectangles which are hatched vertically indicate the periods of connection of the terminal 36 to the source. The larger rectangle of the greater height indicates the connection which occurs between the times $t_1$–$t_2$ and that of the lower magnitude to the connection during the times $t_3$–$t_4$. The average output voltage of the inverter is proportional to the area of the hatched rectangles and it will be appreciated that the average output voltage due to power factor change varies from a magnitude of ⅘ of the applied voltage which appears between the busses 12 and 14 at zero power factor, as indicated in FIG. 15A, to a magnitude of ⅖ of the voltage appearing between the busses 12 and 14 at the critical power factor, as indicated in FIG. 15C, to a value of ⅙ of the voltage between the input busses 12 and 14 at unity power factor load, as indicated in FIG. 14. The magnitude of the amplitude of the voltage rectangles of FIG. 14, which are vertically hatched, is equal to ½ the magnitude of the voltage at the busses 12 and 14. The loss in voltage due purely to the change in load power factor from zero to unity results in a change in output voltage of 2⅔ or approximately 267 percent.

It will be noted from a study of FIGS. 15A, 15B and 15C that the loss in voltage is from ⅘ to ⅖ as the power factor increases to the critical value. Thus change is caused by the disappearance of the regenerated voltage as indicated by the rectangles which are hatched in an upwardly direction toward the right. Thereafter, the voltage decreases from a magnitude of ⅖ to a magnitude of ⅙ as the power factor increases from the critical value to unity. This is due to the disappearance of the path for the reactive current which formerly existed due to the rendering of a diode conducting by current flow in another phase as indicated by the disappearance of the rectangles representing voltage and indicated by the hatching which extends upwardly toward the left.

FIGURES 15E and 15F represent similarly the current and voltage relationships when the load is an electric motor operating at below and above the critical power factors. The dynamic load differs from the static load by the addition thereto of a counter E.M.F. generated by the motor. The curves of FIGS. 15E and 15F include horizontally hatched rectangles which represent the voltage generated by the back E.M.F. of the motor. It will be noted that FIGS. 15E and 15F include the crossed hatch portions which extend upwardly toward the left and which are there because of the forward current flow turn through a diode established by another phase. As stated this forward current permits, in effect, current to flow backwardly through the conducting diode. In FIG. 15F, it will be noted, as for example, between the times $t_{13}$ and $t_0$ and the times $t_{12}$ and $t_{11}$ there is an interruption in this current. This interruption is due to the fact that there is insufficient conduction of forward current through the diode to permit the current to flow, in effect, rearwardly therethrough. The lack of this path results in a reduction of the voltage applied to the motor.

Figure 16:
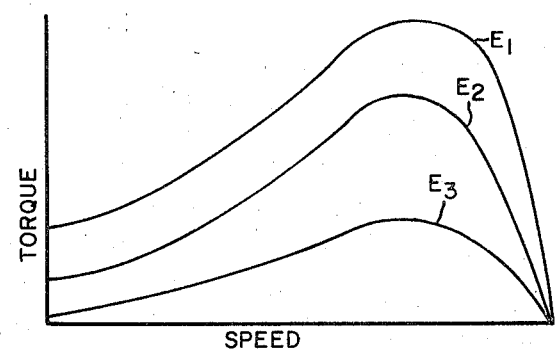
FIG. 16 is a curve showing a characteristics speed-torque curve of a motor.

FIG. 16 shows a typical speed-torque curve for three different applied voltages $E_1$, $E_2$, $E_3$. It will be noted from this curve that when the voltage decreases, the torque which can be maintained at that speed decreases as is indicated by these curves. This reduction in voltage causes the motor to hunt when load on the motor increases sufficiently to cause the power factor of the motor to increase beyond the critical power factor. Experience has shown that if the power factor is increased sufficiently beyond this control power factor the motor will again become stable and operate according to the characteristics of a reduced voltage torque curve. However, during a first increase in power factor beyond the critical power factor, the motor will hunt and apparently shifts back and forth between the torque curves because of the change in applied voltage.

FIG. 17 shows diagrammatically the improved method for operating the inverter of FIG. 11. In accordance with the method of this invention each pair of lines or busses 30–32, 32–34 and 34–30 are connected to the input busses 12 and 14 for two discrete equal periods spaced apart 60 electrical degrees each half cycle of the output voltage which is applied to the load 42. These pulses are indicated by the curve 58 of FIG. 18.

With the operation of the inverter sequenced as indicated by FIG. 17, the thyristor A is rendered conducting at the time $t_{10}$ and is maintained conducting until the time $t_0$. It is also maintained conducting during the interval $t_2$–$t_4$. The time interval $t_1$–$t_2$ is variable to provide the desired magnitude firing angle, $\theta$. The angle $\theta$ can vary, as indicated in FIG. 17, from the time interval $t_0$ to $t_2$ which interval is 60 electrical degrees based on the output alternating current frequency. As angle $\theta$ varies the interval $t_1$–$t_2$ from 60 to zero degrees, the magnitude of the voltage output of the apparatus varies from full to zero output voltage.

As long as all of the thyristors A, A', B, B' and C and C' are fired for equal intervals ($t_1$–$t_2$), all of the line to line pulses 68 applied to the load 42 will be of equal duration and spaced exactly 60 degrees apart and correspond exactly to the curve shown in FIG. 18. As the magnitude of $\theta$ increases for firing the thyristor A, the magnitude of the firing of the thyristor B' will also increase whereby both positive loops of the curve 58 will always remain exactly 60 degrees apart. As $\theta$ approaches 60 degrees, the two positive loops of curve 58 will intersect one another and provide the 100 percent voltage output as indicated in FIG. 6.

FIG. 19A illustrates the voltage appearing between terminal 36 and neutral of the load 42. FIGS. 19A, 19B, 19C and 19D indicate the current flow through the phase connected between terminal 36 and neutral for various power factors of the load 42. These curves are hatched similarly to the curves 15 to 18. The curves illustrate the fact that as the angle of the power factor increases to the critical power factor a stable voltage is reached and that the magnitudes of the output voltage at angles of greater power factors will remain substantially constant as indicated by the vertically hatched rectangles which remain the same.

The foregoing FIGS. 17 through 19, illustrate new and improved methods for firing an inverter to provide a more desirable ouput thereof. FIGS. 20 through 30 illustrate various structures for performing this method automatically.

Figure 20:
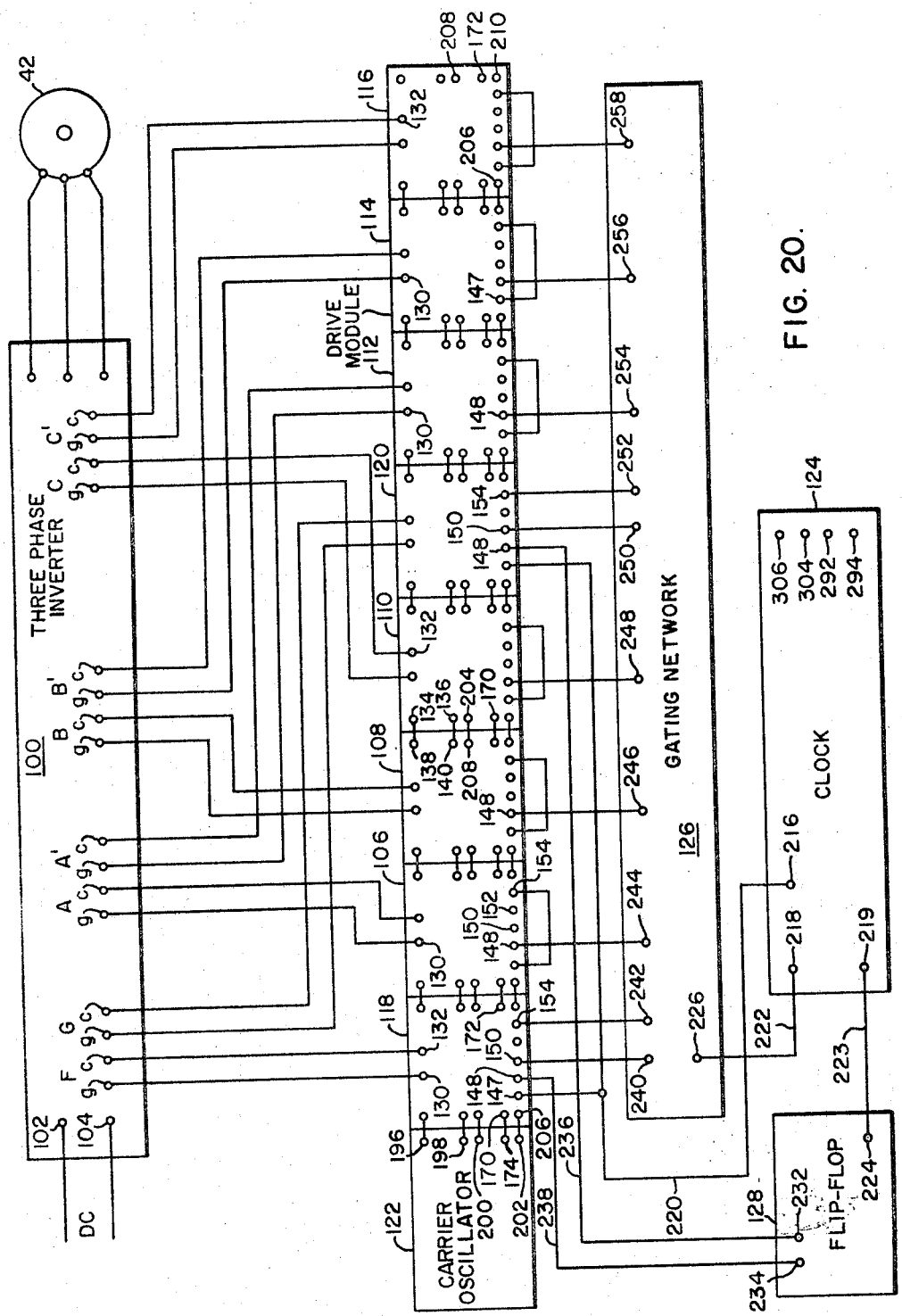
FIG. 20 is a block diagram view of an improved voltage inverting apparatus embodying the invention.

Referring to FIG. 20, the numeral 100 indicates a three phase inverter similar to that illustrated in FIG. 11 and which includes thyristors A, A', B, B', C, C' and diodes 2, 4, 6, 8, 26 and 28. The inverter is shown in greater detail in FIG. 21. The input busses 12 and 14 are connected to the input terminals 102 and 104 of the inverter 100, and are energized from a suitable source of energy such as the supply labeled DC. The thyristors A, A', B, B', C, C' are fired by drive modules 106, 108, 110, 112, 114 and 116 respectively and are extinguished by the drive modules 118 and 120 in accordance with the teaching of a copending application of John Rosa, Serial No. 520,497, and filed concurrently herewith.

The energy for actuating the gates of the thyristors A, A', B, B', C, C', F and G is obtained from an oscillator 122 which, for example, may have an output frequency of 20 kilocycles.

The modules 106-120 are actuated by a clock 124 which acts through a gating network 126 and a flip-flop network 128 as illustrated in FIG. 20. The detailed construction of the modules 106-120 are schematically illustrated in FIG. 23. Each module is provided with output terminals 130 and 132 which are connected to the gate and cathode of the respectively controlled thyristors. Power for the output terminals 130 and 132 is supplied to high frequency input terminals 134, 136 and 170. The terminals 134 and 136 are energized during alternate half cycles of the high frequency input with a potential which is positive with respect to the terminal 170. The terminals 134 and 136 are respectively connected to busses 142 and 144, which are connected through transformers 146 and 180 to the pair of high frequency output terminals 130 and 132.

Control input signals for controlling the energization of the transformers 146 and 180 are supplied from the control terminals 147, 148, 150, 152 and 154. For this purpose, the primary winding 156 of the transformer 146 has its end terminals connected to the busses 142 and 144 through diodes 158 and 160. These diodes are polarized for current from the busses 142 and 144 through opposite halves of the primary winding 156. The center tap connection 162 of the winding 156 is connected through a diode 164, through the collector c and emitter e of a transistor 166 and a bus 168 to the terminal 170. The modules are designed to be connected together to the oscillator 122 and for this purpose the bus 168 interconnects the terminal 170 to a terminal 172 and the busses 142 and 144 interconnect the terminals 134 and 136 to terminals 138 and 140 respectively. As indicated in FIG. 20 terminals 134, 136 and 170 are connected respectively to output terminals 196, 198 and 174 of the oscillator 122.

The secondary winding 176 of the transformer 146 has its end terminals connected through diodes, a common resistor and a resistor capacitor network 176 to the output terminal 130. The center tap connection of the secondary winding 176 is connected by conductor 178 to the other output terminal 132. When the transistor 166 conducts, current flow paths are alternately established from the busses 134 and 136 through the opposite halves of the primary winding 156. Current flow through these paths energizes the secondary winding 176 which thereupon establishes a positive to negative potential at the output terminals 130-132 to fire the associated thyristor.

The transformer 180, when energized provides a small magnitude of reverse potential at the gate and cathode of the thyristors. The transformer 180 has center tapped primary and secondary windings 182 and 184. The end terminals of winding 182 are connected between the busses 142 and 144 through diodes 186 and 188 similarly to the connection of the primary winding 156. The center tap of winding 182 is connected through the collector-emitter circuit of a transistor 190 to the bus 168.

The secondary winding 184 has its end terminals connected through diodes to the output terminal 132 and its center tap connected through a resistor to the output terminal 130. With this arrangement, the transformer 180 when energized maintains the output terminal 132 positive with respect to the output terminal 130 to provide a small negative bias between the gate and cathode of the thyristor to which this module is connected.

The oscillator 122 may take any convenient form and is illustrated in FIG. 22 as comprising a pair of transistors 192, 194 which alternately conduct to energize its pair of output terminals 196 and 198 with a positive potential with respect to its output terminal 174. The oscillator 122 is also provided with potential input terminals 200 and 202 which are connected to positive and negative output terminals of a suitable source of unidirectional electrical energy. Specifically each of the modules 106–120 is provided with output terminals 204 and 206. These terminals 204 and 206 are connected internally in each module to input terminals 208 and 210 by busses 212 and 214. The terminals 208, 210 and 172 of the module 116 as indicated in FIG. 20 are connected to the positive, negative and intermediate terminals of a suitable source of unidirectional potential as for example a battery having its positive terminal connected to terminal 208, its negative terminal connected to terminal 210 and its intermediate terminal grounded and connected to the terminal 172.

As illustrated in FIG. 21, the thyristors A, A', B, B', C, C', F and G are each provided with a gate terminal g and a cathode terminal c. These are connected respectively to the output terminals 130 and 132 of the modules 106, 112, 108, 114, 110, 116, 118 and 120 as diagrammatically illustrated in FIG. 20.

The details describing the commutation of the thyristor of the inverter of FIG. 21 are fully set out in the copending application of Rosa. As set forth therein, each time the thyristor F is fired, the conducting ones of the thyristors A, B or C are rendered nonconducting and remain nonconducting until refired. Similarly the firing of the thyristor G renders the conducting ones of the thyristors A', B' and C' nonconducting. They must be refired for further conduction. For the purposes of understanding this invention, it is necessary merely to understand that when any one of the thyristors A, B, C or A', B' and C' are desired to be rendered nonconducting, it is necessary merely to fire the thyristor F or G as the case may be.

Figure 25:
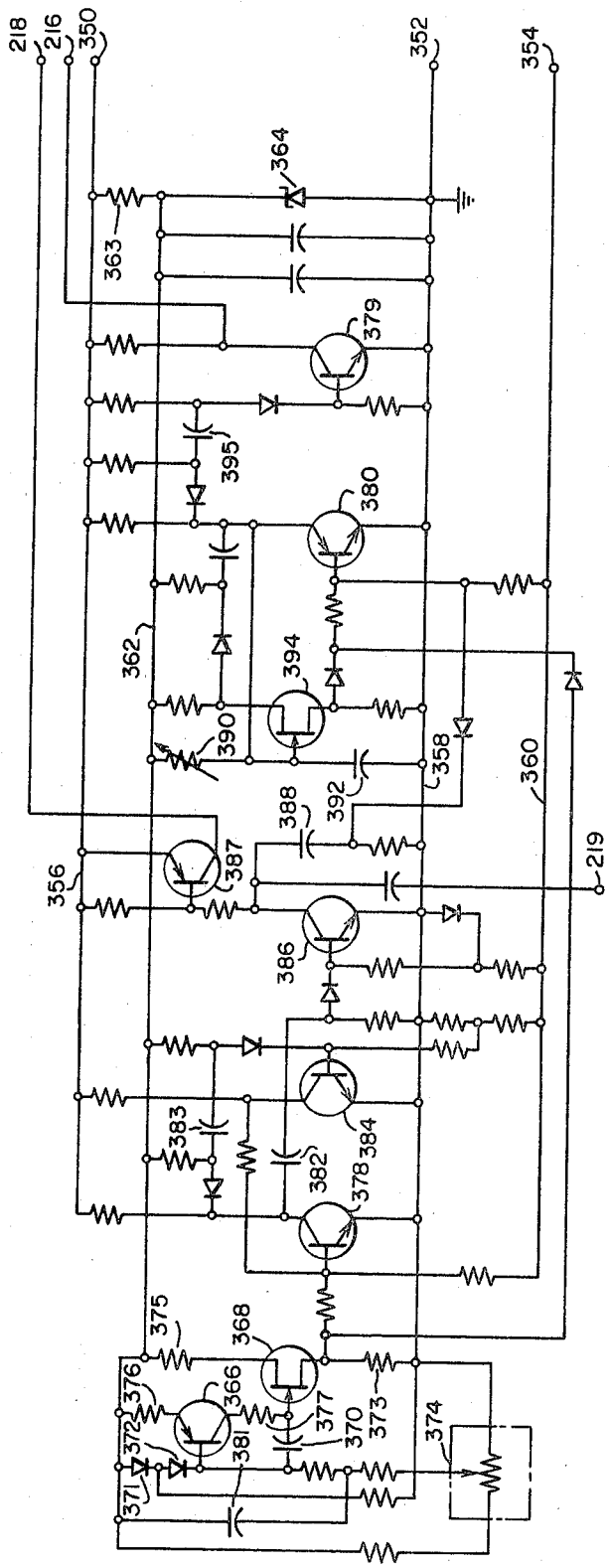

The rendering of the thyristors A, B, C and A', B' and C' conducting is accomplished by rendering the transistor 166 of the proper module 106, 108, 110, 112, 114 or 116 conducting. This is controlled by the gating network 126 and the clock network 124. The details of the clock network 124 are shown in FIG. 25.

The clock network 124 is energized from a suitable source of potential such as a center-tapped battery (not shown) having its positive terminal connected to a terminal 350, its negative terminal connected to a terminal 354 and its grounded intermediate or center-tapped terminal connected to a terminal 352. Internally the clock network or module comprises busses 356, 358 and 360 which connect to the terminals 350, 352 and 354. A positive voltage regulated bus 362 is energized from the bus 350 through a resistor 363 and the voltage between the busses 362 and 358 is controlled by a Zener diode 364 connected therebetween. The module 124 is further provided with output terminals 216 and 218 which are periodically and alternately energized to provide $P_1$ and $P_2$ pulses respectively. These pulses occur in phase displaced relation at a frequency determined by a unijunction oscillator comprising transistors 366 and 368 and a capacitor 370.

Initially, the capacitor 370 is charged to a voltage which is nearly equal to the voltage between the busses 362 and 358 through diodes 371 and 372, transistor 368 and resistor 373 after which the transistor 368 becomes nonconducting. The capacitor 370 then commences to discharge through resistor 376, transistor 366, resistor 377 and potentiometer 374. When the charge on the capacitor 370 reaches a critical voltage, the transistor 368 switches on and the capacitor recharges through the transistor 368, the resistor 373 and diodes 371 and 372. This causes a pulse to appear across the resistor 373. The pulses appearing across resistor 373 are supplied to transistor 378 and turn-off thyristor 380. This causes transistor 378 to turn on and will cause thyristor 380 to turn on if it is not already on as described below.

The variable resistor 374 is included in the discharging circuit of the capacitor 370 for adjusting the oscillatory frequency of the clock module 124. A capacitor 381 limits the rate at which the operating frequency can be changed by varying the resistance of the resistor 374. The conduction intervals of the thyristors A–C′ are terminated by the turning on of the thyristor 380. The rendering of thyristor 380 conducting momentarily turns off the normally conducting transistor 379 and a positive pulse $P_1$ is supplied to the output terminal 216.

When the transistor 378 is turned on, it discharges the capacitor 382 in preparation for the recharging thereof through the base of transistor 386. When transistor 378 is rendered conducting, the commutating capacitor 383 turns off the normally conducting transistor 384 for the period required for the capacitor 383 to discharge.

Subsequently, when the transistor 378 reblocks, the capacitor 382 charges through the base circuit of the transistor 386 to render transistor 386 conducting for the charging period of the capacitor 382. When transistor 386 conducts it provides base current for a second transistor 387 which conducts and provides a positive $P_2$ pulse at the output terminal 218.

In order to insure that the inverter 100 may be commutated after each $P_2$ pulse, the transistor 386 is capacitively coupled to the thyristor 380 through a capacitor 388 which causes thyristor 380 to be rendered nonconducting when a $P_2$ pulse occurs.

The pulses for firing the transistor 166 of the modules 118 and 120 (commutating) are directly supplied from the clock terminal 216 by means of a conductor 220 and occur as a consequence of the conduction of transistor 379 of the clock module. The output terminal 218 is connected by a conductor 222 to the input terminal 226 of the gating network 126. A second output terminal 219 is connected by a conductor 223 to an input terminal 224 of the flip-flop 128.

The flip-flop 128 is shown in greater detail in FIG. 26 and comprises a pair of transistors 228 and 230 which alternate in conduction every time a negative pulse is applied to the input terminal 224. Conduction of the transistor 228 clamps output terminal 232 to ground and conduction of the transistor 230 clamps the output terminal 234 to ground. The output terminal 232 is connected by means of a conductor 236 to the input terminal 148 of the module 120 while the terminal 234 is connected by means of a conductor 238 to the terminal 148 of the module 118.

Figure 24:
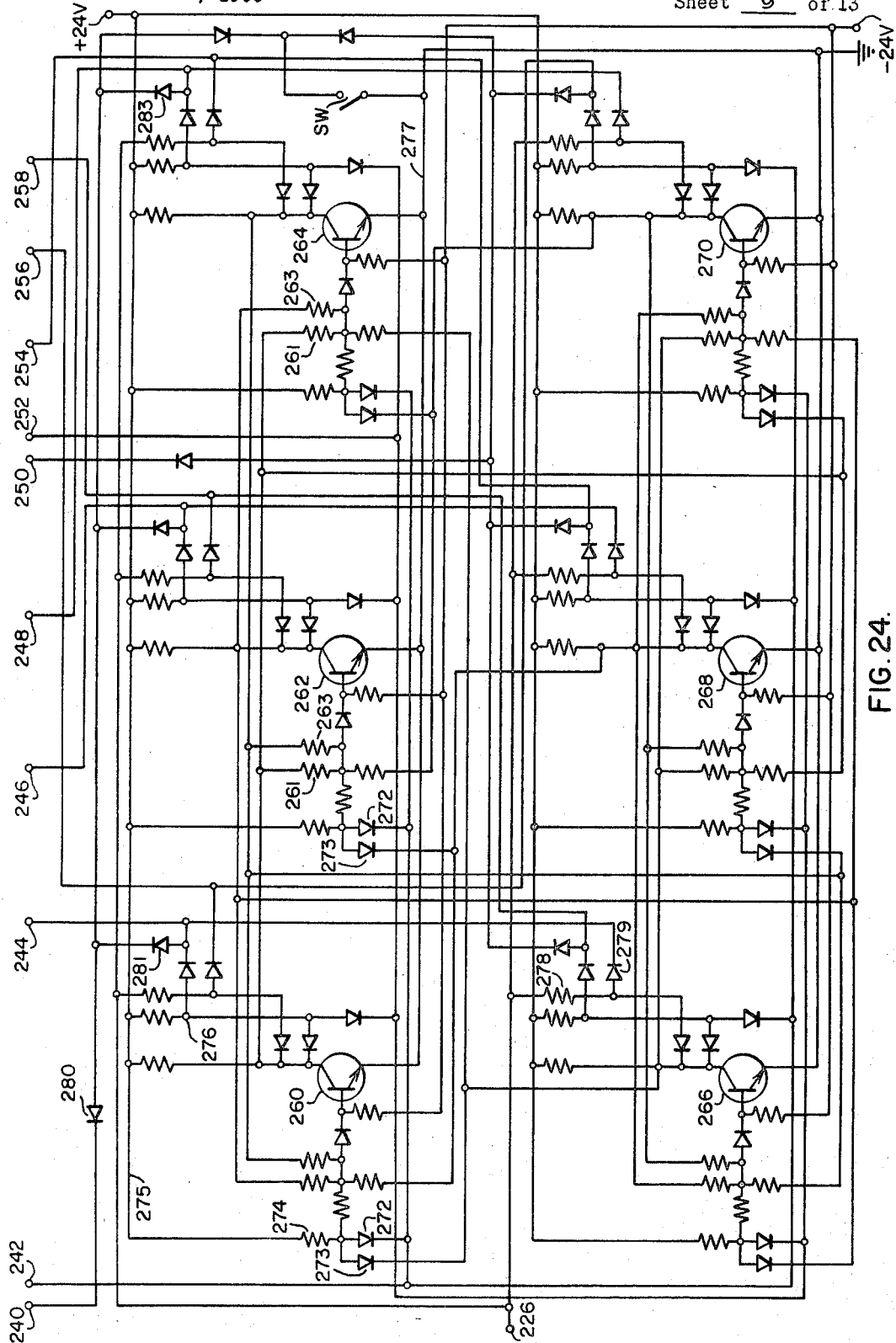

The gating network 126, shown in detail in FIG. 24, is provided with additional input terminals 240, 242, 250 and 252 and with control terminals 244, 246, 248, 254, 256 and 258. The input terminals 240 and 242 are connected to output terminals 150 and 154 respectively of the module 118 and the input terminals 250 and 252 are connected to the output terminals 150 and 154 of the module 120. The terminals 244, 246 and 248 are connected respectively to the input terminals 148 of the modules 106, 108 and 110 while the terminals 254, 256 and 258 are connected to the input terminal 148 of the modules 112, 114 and 116.

The remaining details of construction can be understood by a description of the operation of the three-phase apparatus of FIG. 20. Just prior to the time $t_0$ (FIG. 17) transistors 262 and 264 (FIG. 24) of the first group of three transistors 260, 262 and 264 will be conducting and transistors 268 and 270 of the second group of three transistors 266, 268 and 270 will be conducting. Each group of three transistors are interconnected as illustrated. Under stable conditions two transistors must be conducting and one transistor must be nonconducting. At time $t_0$, a $P_1$ pulse will be generated by the clock network 124 at its output terminal 216. This $P_1$ pulse is applied by conductor 220 to the control terminal 147 of the turn off module 118 to block conductor of diode 145. Since at the time $t_0$ the transistor 228 of the flip-flop network is nonconducting, the terminal 148 is disconnected from the grounded bus 168 and the transistor 166 will commence to conduct and the transistor 190 will become nonconducting.

The blocking of transistor 190 interrupts the circuit through the primary winding 184 of the transformer 180 and the conduction of the transistor 166 establishes a circuit through the primary winding 156 of the transformer 146 whereby the polarity of the potential at the output terminals 130 and 132 of the module 118 will provide a firing pulse between gate and cathode of the commutating thyristor F.

The blocking of the transistor 190 also raises the potential of the output terminal 154 of the module 118 to supply an $\overline{X}$ pulse to the input terminal 242 of the gating network 126. The duration of the blocked condition of transistor 190 and conducting condition of transistor 166 is determined by the duration of the pulse $P_1$ and typically may be of an interval of 25 to 50 microseconds which is a sufficient time for firing the thyristor F.

The $\overline{X}$ pulse produced by module 118 by the conduction of its transistor 190 blocks the previously conducting diode 272 and since diode 273 is blocked by the positive potential applied to its cathode because of the non-conducting condition of transistr 266, the transistor 260 will now conduct due to the base current flow thereto through the resistor 274 from the +24V bus 275. Conduction of transistor 260 connects the terminal 276 to ground. Since the $P_2$ pulse generated at the output terminal 218 of the clock network 124 is not being generated at this time, the terminal 244 falls to the potential of the zero potential bus 277. This places the terminal 148 of module 106 at the potential of its zero potential bus 170 and the transistor 166 becomes non-conducting. This removes the firing signal at the output terminals 130 and 132 of the module and from the gate of thyristor A. The $\overline{X}$ pulse is coincident with the P1 pulse and the thyristod A is extinguished, as indicated in FIG. 17, time $t_0$.

When transistor 260 became conductive, it removed one of the sources of base drive for the transistor 262 which was being supplied from the emitter bus of transistor 260 through the resistor 261. The magnitude of the resistors which are connected to the base of any one of the transistors of the gating circuit are such that, in the absence of a blocking action by the $\overline{X}$ or $\overline{Y}$ pulses and the blocking of the companion diodes (272 and 273), current supplied through either resistor 261 or 263 will maintain the associated transistor conducting. The removal of the current flow through resistor 261 to the transistor 262 causes it to become non-conductive or blocked, since at this time the conducting condition of transistor 264 prevented base current from flowing to transistor 262 through resistor 263.

Conduction of the transistor 260 interrupts the flow of base current through resistor 261 of the base circuit of transistor 264, but base current was established to the transistor 264 through its base resistor 263 from the collector bus of transistor 262, which is now at a positive potential.

The blocking of transistor 262 causes the potential of the output terminal 258 to rise which in turn causes the transistor 166 of module 116 to conduct and the companion transistor 190 to block, whereby the thyristor C′ of the inverter 100 is rendered conducting.

The modules 106–110 and 122–116 have their terminals 154 and 147 individually strapped together so that diode 145 is blocked when transistor 190 is blocked and conductive when transistor 190 conducts so that the transistor 166 continues to conduct after a positive voltage has appeared at terminal 148.

When the pulse $P_2$ occurs (time $t_1$), the gate network 126 is actuated to pulse its output terminal 244 through a circuit which extends from the terminal 226 through resistor 278 and diode 279. It should be noted that at time $t_1$ an X output pulse is present at the output terminal 150 of module 118 because of the blocked condition of its transistor 166. This effectively blocks the common diode 280 and the individual diode 281 which would otherwise clamp the terminal 244 at the potential of the ground bus 168.

The terminal 244 is connected to the terminal 148 of module 106 so that the resulting pulse causes the transistor 166 to conduct and the transistor 190 to block whereby the gating circuit for thyristor A as energized in a polarity to render thyristor A conducting. Once the transistor 190 blocks, the transistor 166 will receive base drive from the terminal 154 of the module and will remain conducting as long as the X pulse continues. The X pulse continues until the module 118 is actuated to commutate the inverter 100.

At the time $t_0$ when the $\overline{X}$ pulse appeared and the X pulse disappeared, the terminal 248 was clamped to ground potential through the common diode 280 and an individual diode 283. The terminal 248 is connected to the terminal 148 of module 110 and the grounding of the terminal 248 shunts the base drive to the transistor 166 of module 110 whereby the conducting gate drive to the thyristor C is terminated.

The time interval between the pulses $P_2$ and $P_1$ may be varied by varying the magnitude of the resistance of the variable resistor 390 (FIG. 25) which controls the charging interval of capacitor 392 of the clock module 124 and thereby the time at which the transistor 394 fires the thyristor 380. The firing of thristor 380 causes the transistor 379 to cease conducting for the interval required to charge the capacitor 395. This, as described above, supplies the pulse $P_1$ at the clock module output terminal 216.

The length of the interval between the $P_2$ and the $P_1$ pulses determines the angle $\theta$ of FIG. 2.

When the transistor 386 conducts and reblocks, it supplies a triggering pulse to the output terminal 219 and thereby to the input terminal 224 of the flip-flop 128 which reverses the conducting condition of its transistors 228 and 230. This occurs at a time following time $t_1$. This operation removes the clamping circuit at terminal 148 of module 120 and establishes a clamping circuit at terminal 148 of module 118. The establishing of the clamping circuit for module 118 prevents the next subsequent pulse $P_1$ from rendering the transistor 166 thereof conductive. The removal of the clamping circuit for module 120 permits the next subsequent pulse to render the transistor 166 thereof conducting.

At the time $t_2$ a pulse $P_1$ will actuate the module 120 to fire the commutating thyristor G in the manner described above in connection with the operation of module 118. The actuation of the module 120 provides a Y pulse and removes a Y pulse. The $\overline{Y}$ and Y pulses correspond to the $\overline{X}$ and X pulses derived from the module 118. This results, in a manner similar to that discussed above, in the rendering of the thyristors C' and B' non-conducting. Also, as described above in connection with the transistors 260, 262 and 264, the transistor 266 will be rendered conducting and the transistor 208 will become blocked whereby module 108 will be actuated to fire thyristor B. At the time $t_2$ the clock module transistors 386 and 387 momentarily conduct. When transistor 386 returns to its blocked state, the terminal 219 is pulsed to shift the flip-flop back to the condition wherein transistor 228 conducts and the transistor 230 blocks. The conduction of transistor 228 establishes a clamping circuit for the module 120 to prevent the next $P_1$ pulse from actuating it. The blocking of transistor 230 removes the clamping circuit for the module 118 to place it in condition to respond to the next $P_1$ pulse.

The above-described operation is repeated at the times $t_3$, $t_4$, $t_{12}$, $t_{11}$, $t_6$, $t_7$, $t_8$, $t_{10}$, $t_{13}$, $t_0$, $t_1$, $t_2$ . . . as long as the inverter control switch SW is maintained opened. The inverter of FIG. 21 may be driven as a single phase inverter by either the omission of, or the non-use of, the thyristors C and C' and diodes 26 and 28 and the addition of the circuitry 17 illustrated in FIGS. 7 and 27 which includes the thyristors D, D', E and E' and the capacitor 10. The modified inverter of FIG. 27 may be driven as schematically illustrated in FIG. 20 which includes the high frequency oscillator 122 and drive modules 106, 108, 112, 114, 118 and 120 connected to be driven by the gating network 126.

The thyristors D, D', E and E' may be controlled by means of modules 314, 316, 310 and 312 which are identical to the module shown in FIG. 23. These modules control the application of gate current to the thyristors D, D', E and E' from an oscillator 318. The oscillator 318 may be identical to the oscillator 122 as illustrated in FIG. 22.

Figure 27:
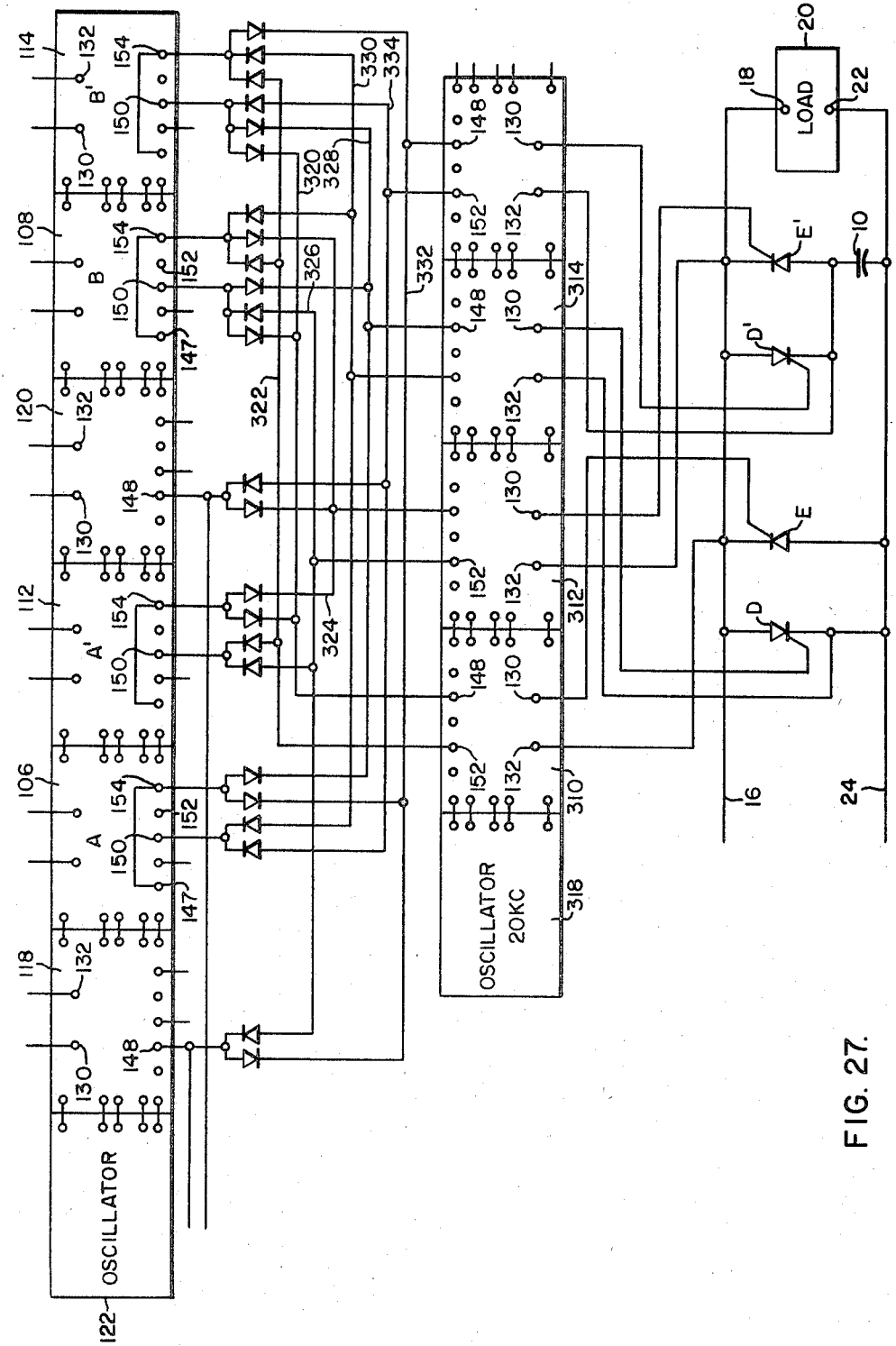
FIG. 27 is a view similar to FIG. 20 but showing an apparatus for driving the inverter of FIG. 7 in accordance with the method of FIG. 9.

The modules 310 through 316 are connected to be controlled by the modules 106, 112, 108 and 114 as illustrated in FIG. 27 through AND and OR circuits whereby the thyristors D, D', E and E' are sequenced as illustrated in FIG. 9.

For this purpose, the terminals 148 and 152 of the module 310 are connected respectively to busses 320 and 322, the terminals 148 and 152 of module 312 are connected to the busses 324 and 326, the terminals 148 and 152 of the module 314 to the busses 328 and 330 and the terminals 148 and 152 of the module 316 to the busses 332 and 334. The output terminal 150 of the module 106 is connected through a pair of diodes to the busses 330 and 334 and the terminal 154 is connected through a pair of diodes to the busses 328 and 332. The module 112 has its terminal 150 connected through a pair of diodes to the busses 322 and 326 and its terminal 154 connected through a pair of diodes to the busses 320 and 324. The module 108 has its terminal 150 connected through three diodes to the busses 320, 326 and 328 and its output terminal 154 connected through three diodes to the busses 322, 324 and 330. Likewise, the module 114 has its terminal 150 connected through three diodes to the busses 320, 328 and 334 and its terminal 154 connected through three diodes to the busses 322, 330 and 332. The module 120 has its terminal 148 connected through two diodes ot the busses 324 and 334. The module 118 has its terminal 148 connected through two diodes to the busses 326 and 332. The output terminals 130 and 132 of the modules 310–316 are connected to the control circuits of the thyristors E, E', D and D' so that these thyristors will be fired as indicated in FIG. 9 to provide shunting paths between the terminals 18 and 22 during the intervals $t_0$–$t_1$ and $t_{11}$–$t_6$. Conduction of the thyristors D' and E' interrupt conduction of the thyristors D and E at the times $t_1$ and $t_6$ respectively. It is believed that the operation of the apparatus of FIG. 27 will be apparent from the above description in connection with the description of operation of the apparatus of FIG. 20.

Figure 28:
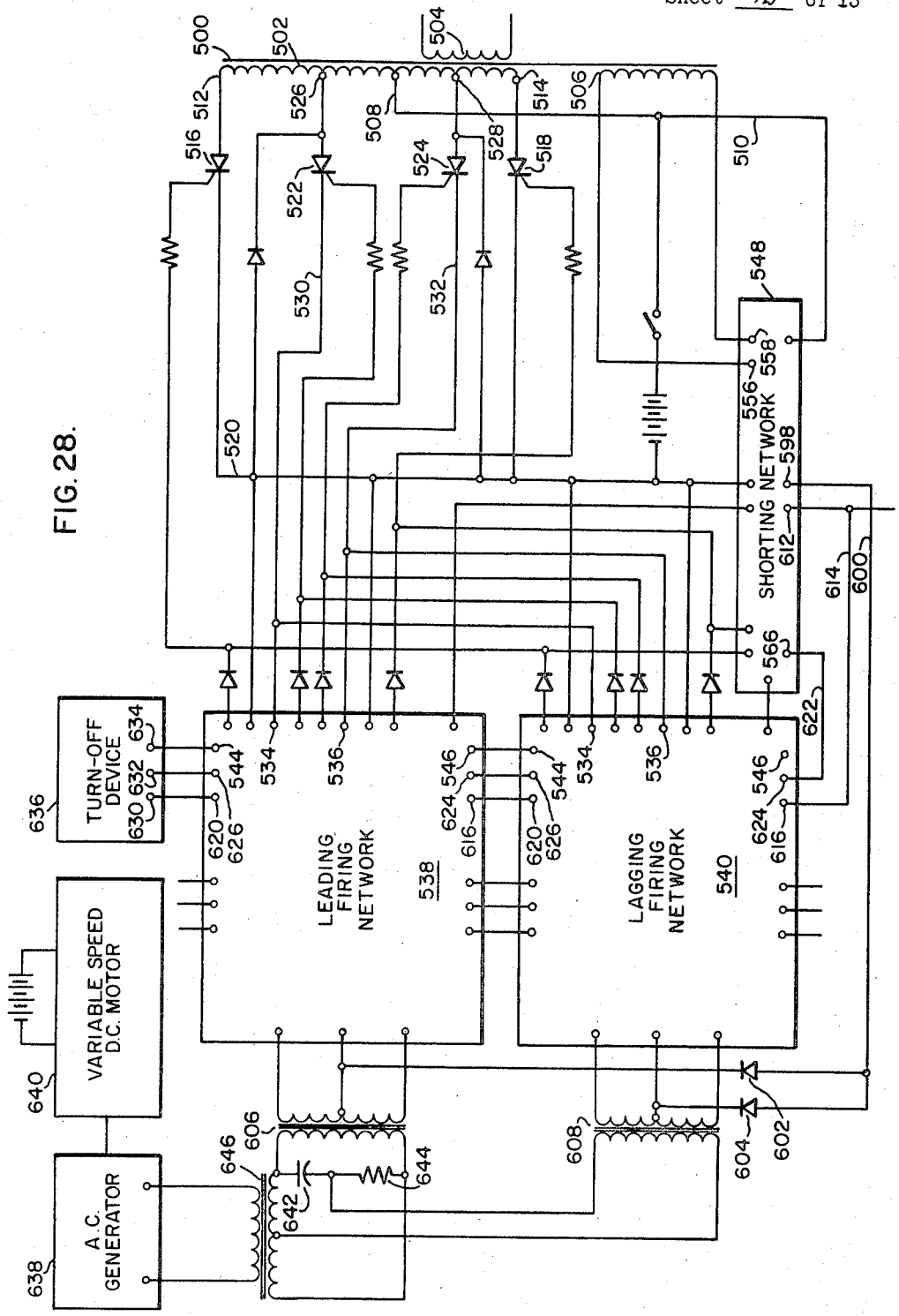
FIG. 28 illustrates in partial block diagram a push-pull or parallel type single phase inverter embodying the method and apparatus of this invention.
Figure 29:
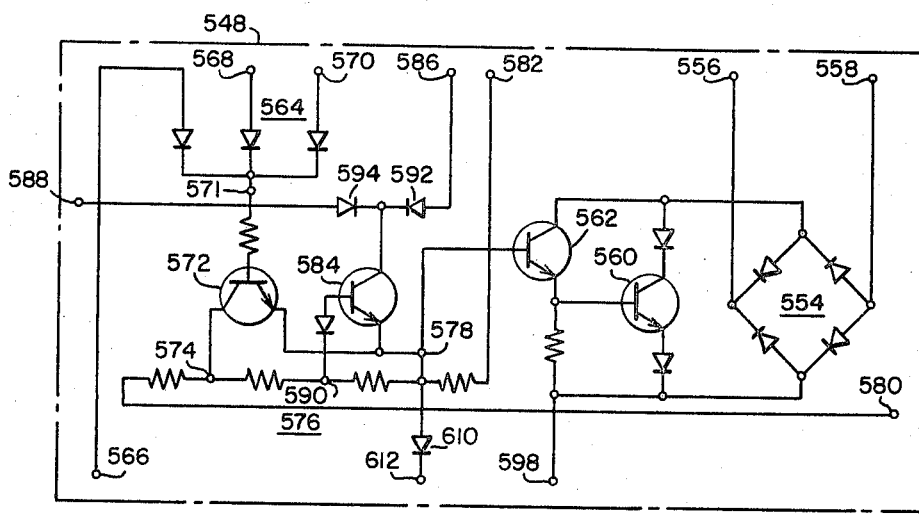
FIGS. 29 and 30 illustrate schematically the apparatus shown in certain of the boxes of FIG. 28.
Figure 30:
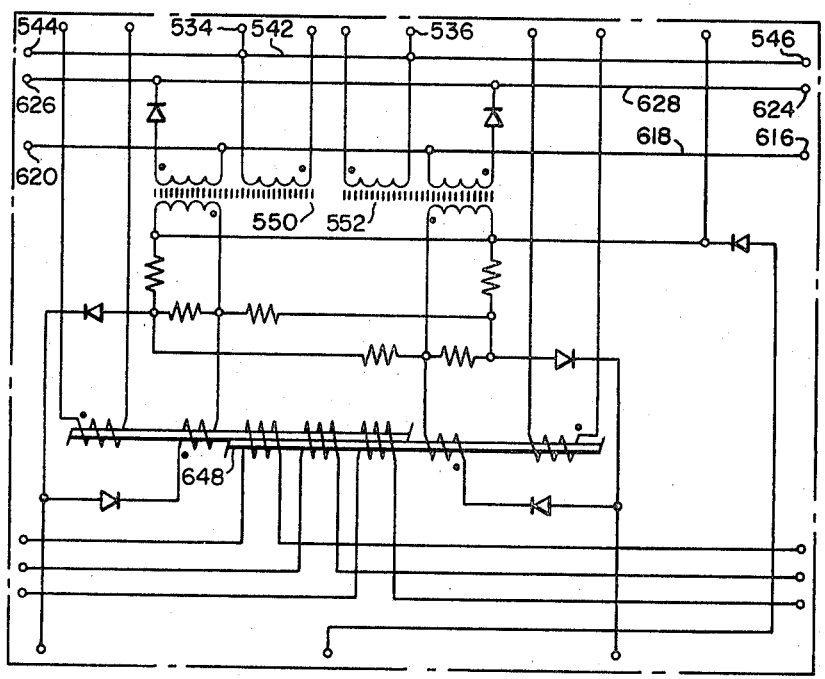

FIG. 28 sets forth partially in schematic and partially in block diagram a different form of inverter commonly known as the push-pull or parallel type. This type of inverter may be actuated in accordance with the method of this invention. The inverter of FIG. 28 comprises an output transformer 500 having a primary winding 502, a secondary winding 504 and a tertiary winding 506. The center tap 508 of the primary winding 502 is connected to a positive potential input bus 510 and the end terminals 512 and 514 are connected through thyristors 516 and 518 respectively to the negative potential supply bus 520.

The thyristors 516 and 518 are extenguished respectively by firing thyristors 522 and 524. The thyristor 522 connects a first intermediate terminal 526 of the primary winding 502 to a conductor 530. The thyristor 524 connects a second intermediate terminal 528 of the winding 502 to a conductor 532. These conductors 530 and 532 are connected to terminals 534 and 536 of the leading and the lagging firing networks 538 and 540. The leading and lagging firing networks 538 and 540 are identical and are shown in detail in FIG. 30. The terminals 538 and 540 of each network are connected to a network bus 542 which extends between network terminals 544 and 546.

The firing networks 538 and 540 jointly control the firing of the thyristors 516, 518, 522 and 524; each network 538 controlling the aforementioned thyristors in substantial accordance with the more complete description and claiming in copending application, Ser. No. 118,030 of A. Kernick and T. M. Heinrich, now abandoned in favor of the then copending continuation-in-part application Ser. No. 513,385, which is now U.S. Patent No. 3,304,484 dated Feb. 14, 1967, and assigned to the same assignee as is this application. In the just mentioned copending application, the tertiary winding 176 is provided with a shorting network 174 controlled by the potential of bus 149. In this application, a somewhat modified form of shorting network 548 is provided and which is shown in greater detail in FIG. 29.

In the Kernick et al. application, the shorting network 174 was effective to short its associated tertiary winding 176 whenever the transformers 154 or 184 thereof were saturated. In this application, the shorting network 548 acts to short the tertiary winding 506 under the joint control of the leading and lagging firing networks 538 and 540 and shorts the tertiary winding 506 whenever all of the transformers 550 or 552 of both of the firing networks 538 and 540 are saturated. This occurs solely when all of the thyristors 516–522 are non-conducting. The shorted winding 506 provides a shorting path equivalent to that provided by the thyristors D and E as illustrated in FIG. 7.

The shorting network 548 (FIG. 29) is provided with a shorting bridge 554 having two of its opposite corners connected to terminals 556 and 558 and its other opposite corners connected together through a transistor 560. The terminals 556 and 558 are connected to opposite ends of the tertiary winding 506. A second transistor 562 controls the conductive condition of transistor 560 in the manner set forth in the said Kernick et al. application.

The shorting network 548 also includes a NAND circuit 564 having input terminals 566, 568 and 570 and an output terminal 571 connected through a resistor to the base of a transistor 572. The collector and emitter of the transistor 572 are connected between intermediate terminals 574 and 578 of a potential dividing network 576. The network 576 is energized by the potential appearing between positive and negative potential input terminals 580 and 582.

If potential is supplied to any one of the NAND circuit input terminals 566, 568 and 570, base current will cause the transistor 572 to conduct collector to emitter whereby a second transistor 584 is prevented from conducting even though emitter-collector potential is supplied thereto from one or both of a pair of input terminals 586 and 588. For this purpose, the base of the transistor 584 is connected through a Zener diode to an intermediate potential terminal 590 located intermediate the terminals 574 and 578 of the dividing network 576. The collector of the transistor 584 is connected to the input terminals 586 and 588 through diodes 592 and 594 and its emitter is connected to the intermediate terminal 578. The emitter of transistor 584 is also connected to the base of the transistor 562 and controls base current flow to the transistor 576 when the transistor 584 is conducting in response to an input signal from one or the other of the input terminals 586 and 588.

The emitter circuit for the transistor 584 continues through the base emitter circuit of the transistor 562 to the output terminals 598 which, as illustrated in FIG. 28, is connected by conductor 600 and diodes 602 and 604 to the center tap connections of the driving transformers 606, 608. These transformers correspond to the transformers 24 of the Kernick et al. application and energize the leading and lagging firing networks 538 and 540 respectively.

The intermediate terminal 578 is connected through a diode 610 to an output terminal 612 which terminal is connected by means of conductor 614 to an input terminal 616 of the lagging firing network 540. This terminal 616 is connected internally in the network by a bus 618 to an upper terminal 620. A conductor 622 connects the shorting network terminal 566 to terminal 624 of the lagging firing network 540. This terminal 624 is connected to an upper terminal 626 internally within the network by a bus 628. The terminals 620, 626 and 544 of the network 540 are connected respectively to the terminals 616, 624 and 546 of the network 538 while the terminals 620, 626 and 544 of the leading firing network 538 are connected to the input terminals 630, 632 and 634 of the pass-around turnoff device 636. The operation of this turnoff device is set forth in detail in the Kernick et al. application.

Alternating potential for driving the firing networks is derived from a suitable source such as an AC generator 638 driven by a controllable speed DC motor 640 which may have its speed adjusted to control the frequency of the output potential supplied by the secondary winding 504 of the inverter. The lagging firing network is connected to lag the operation of the leading firing network by 60 electrical degrees through a phase shift circuit which comprises a capacitor and resistor 642 and 644. It will be noted that the driving transformer 606 of network 538 is energized directly from the output transformer 646 directly energized by the AC generator 638 while the primary winding of the transformer 608 is connected to the phase shifted output terminals.

The phase angle $\theta$ as illustrated in FIG. 2 may be varied by means of varying the saturating time of the magnetic amplifier 648 by means of a suitable circuit such as that shown in the Kernick et al. application. As set forth in the Kernick et al. application, the saturating time of the magnetic amplifier controls the time interval between the existance of a critical potential on the transformer 606 and the firing of the proper one of the thyristors 516 and 518.

The time of firing of the thyristors 522 and 524 is controlled by the saturating time of the saturating transformers 550 and 552 also as set out above in the Kernick et al. application. For the purposes of this application, it is believed sufficient to state that the thyristor 516 is fired for an initial time interval corresponding to the time $t_{1a}-t_{2a}$ of FIG. 8 after which it is extinguished by the firing of the thyristor 522. Thereafter the transistor 560 of the shorting network is rendered conducting to effectively short the tertiary winding 506. At the time $t_{4a}$ the lagging firing network 540 will again fire the thyristor 518 for the time interval $t_{4a}-t_{5a}$ and the thyristor 522 will be fired by the network 540 and render the transistor 560 of the shorting network conducting to short the tertiary winding 506. This short on the winding remains effective until the time interval $t_{6a}$ at which time the leading firing network 538 fires the thyristor 518 for the time interval $t_{6a}-t_{7a}$. At the time $t_{7a}$, the network 538 fires the thyristor 524 which extinguishes the thyristor 518 as shortly thereafter the transistor 560 will again conduct to effectively short the tertiary winding 506. This short remains on the winding 506 until the time $t_{9a}$ at which time the thyristor 518 is fired by the lagging firing network 540 for the time interval $t_{9a}-t_{10a}$, at the time $t_{10a}$ the network 540 fires the thyristor 524 to extinguish the thyristor 518. Shortly thereafter, the saturating of the transformer 552 of the network 540 causes the transistor 560 to conduct and to short the winding 506. This short remains on the winding until such time that the leading network 538 is again effective to fire the thyristor 516 and a repeat cycle is obtained.

Since numerous changes may be made in the above described apparatus and different embodiments of the invention may be made without departing from the spirit thereof, it is intended that all matter contained in the foregoing description or shown in the accompanying drawings, shall be interpreted as illustrative and not in a limiting sense.

What is claimed as is desired to be secured by United States Letters Patents is as follows:

1. The method of energizing an inductive load at a pair of terminals from a unidirectional potential source of electrical energy comprising the steps of providing a current path between said terminals in which any voltage established by said current in said path is substantially independent of the magnitude of the current and maintaining the path for a given number of electrical degrees of connecting said source to said terminals in a first polarity for a predetermined number of electrical degrees for flow of energy in either direction therebetween, of interrupting said just-named connection in one direction while at the same time maintaining a current path between said terminals and through said source for flow of energy from said terminals to said source for a required number of said electrical degrees, of connecting said source to said terminals for flow of energy to said terminals in said first polarity for a wanted number of electrical degrees, and of interrupting the flow of energy from said source to said terminal and concurrently providing a current path between said terminals for a desired number of electrical degrees and through which path current flows for at least a portion of said desired number of electrical degrees and in which path the voltage thereacross is substantially independent of the magnitude of the current therethrough.

2. The method of claim 1 in which said wanted number is equal to said predetermined number.

3. The method of claim 2 in which the combined sum of said given number plus the sum of said predetermined number plus one-half the sum of said required number is equal to ninety.

4. The method of claim 2 in which said desired number is less than sixty and more than thirty.

5. The method of claim 4 in which there is provided the steps of maintaining said last-named path for a time interval equal to the sum of said desired number and said given number of degrees, of connecting said source to said terminals in a second polarity for said predetermined number of said degrees for flow of energy in either direction therebetween, of interrupting said last-named connection in one direction while at the same time maintaining a current conducting path between said terminals and through said source for flow of energy from said terminals to said source for said required number of said electrical degrees, of connecting said source to said terminals for flow of energy to said terminals in said second polarity for said wanted number of said electrical degrees, and of interrupting the flow of energy from said source to said terminals and concurrently providing a current path between said terminals for a desired number of electrical degrees and through which path current flows for at least a portion of said desired number of electrical degrees and in which path the voltage thereacross is substantially independent of the magnitude of the current therethrough.

6. The method of claim 5 in which the initiation of each said wanted interval follows the initiation of the just previous to occur of said predetermined intervals by sixty electrical degrees.

7. The method of claim 2 in which said given number equals said desired number and said predetermined number equals said wanted number.

8. The method of claim 1 in which said predetermined number plus said required number is equal to sixty.

9. The method of claim 1 in which the total of said predetermined number plus said required number plus said wanted number is less than one hundred twenty and greater than sixty.

10. The method of claim 5 in which the total of said predetermined numbers plus said required numbers plus said wanted numbers is less than one hundred twenty and greater than sixty.

11. The method of energizing a polyphase inductive load of N number of phases and N number of load terminals from the positive and negative terminals of a unidirectional potential source of electrical energy comprising the steps (1) of connecting for flow of current in either direction each of said N load terminals to a first of said source terminals at intervals of 360/N electrical degrees and to the second of said source terminals at intervals spaced 180 electrical degrees from each connection to said first terminal, and of maintaining each said connection solely for a period of not less than 180/N electrical degrees and not greater than a period of 360/N degrees, (2) of thereafter altering each said connection to provide for flow of current solely from said load terminal, (3) of realtering each said connection to provide for flow of current to said source terminal for a period of not less than (180–360/N) electrical degrees, (4) of maintaining each individual one of said N load terminals in a condition in which current is prevented from flowing from a first of said source terminals to said individual load terminal during the entire 180 degrees interval that said individual load terminal is being connected to and disconnected from the other of said source terminals.

12. The method of energizing a 3 phase inductive load having 3 pairs of output terminals from a pair of source terminals through 9 pairs of paths, a first group of 3 pairs of said paths being connected to said source terminals for energization therefrom, second and third groups of 3 pairs of said paths being connected to said output terminals for energization therefrom, said first group of paths individually connecting said source terminals to each pair of said output terminals, a first path of each pair of said first group of paths being arranged to energize the pair of said output terminals to which it is connected in first polarities, a second path of each of said first group of paths being arranged to energize the pair of said output terminals to which it is connected in second polarities, said second group of paths individually connecting said pairs of output terminals to said input terminals for energization of said source terminals from said output terminals, said third group of paths individually interconnecting said pairs of output terminals, said paths of said third group having a voltage drop therethrough which is substantially independent of the current therethrough, a first of said paths of each of said second and third groups being effective to conduct current in first directions and a second of said paths of said second and third groups being effective to conduct current in second directions, comprising the steps of sequentially initiating conduction through each of said first paths of said second and third groups of paths and thereafter initiating conduction through each of said second paths of said second and third groups of paths at intervals of 180/N electrical degrees, of maintaining each of said paths of said second group of paths in their conductive condition for first predetermined intervals and each of said paths of said third group of paths in their conductive condition for second predetermined intervals, and of sequentially initiating conduction in each of said first paths of said first group of paths and thereafter initiating conduction in each of said second paths of said first group of paths in alternating relation with the initiating of conduction of said paths of said second group of paths, of maintaining each said path of said first group of paths in its conductive condition for third predetermined time intervals.

References Cited

UNITED STATES PATENTS

| | | | |
|---|---|---|---|
| 3,262,036 | 7/1966 | Clarke et al. | |
| 3,336,520 | 8/1967 | Miyairi et al. | 321—5 |
| 3,354,370 | 11/1967 | Corry et al. | 321—5 X |
| 3,215,860 | 11/1965 | Neuman | 328—186 X |
| 3,324,374 | 6/1967 | Corey | 321—5 |

OTHER REFERENCES

Bedford et al., Principles of Inverter Circuits, John Wiley & Sons, Inc., N.Y., 1964, TK2796, B37 c.2, pp. 234–254.

JOHN F. COUCH, *Primary Examiner.*

W. H. BEHA, JR., *Assistant Examiner.*

U.S. Cl. X.R.

318—138, 227; 321—9